US012342791B2

(12) United States Patent
Becattini, Jr. et al.

(10) Patent No.: US 12,342,791 B2
(45) Date of Patent: Jul. 1, 2025

(54) METHOD AND APPARATUS FOR PET HAIR REMOVAL

(71) Applicant: Towerstar Pets, LLC, Malvern, PA (US)

(72) Inventors: Fernando Becattini, Jr., Malvern, PA (US); Jacquelyn N. Becattini, Malvern, PA (US); Fernando Becattini, Sr., Devon, PA (US); Steve A. Copeland, Barrie (CA); Nicholas Teixeira, Angus (CA)

(73) Assignee: TOWERSTAR PETS, LLC, Malvern, PA (US)

( * ) Notice: Subject to any disclaimer, the term of this patent is extended or adjusted under 35 U.S.C. 154(b) by 800 days.

(21) Appl. No.: 17/560,839

(22) Filed: Dec. 23, 2021

(65) Prior Publication Data

US 2023/0000053 A1    Jan. 5, 2023

Related U.S. Application Data

(60) Provisional application No. 63/217,860, filed on Jul. 2, 2021.

(51) Int. Cl.
*A46B 9/02* (2006.01)
*A01K 13/00* (2006.01)
*A46B 5/00* (2006.01)

(52) U.S. Cl.
CPC .......... *A01K 13/002* (2013.01); *A46B 5/0008* (2013.01); *A46B 9/026* (2013.01); *A46B 5/00* (2013.01); *A46B 2200/3053* (2013.01)

(58) Field of Classification Search
CPC .. A46B 5/00; A46B 3/04; A46B 9/026; A01K 13/00
See application file for complete search history.

(56) References Cited

U.S. PATENT DOCUMENTS

| 1,180,190 A | 7/1868 | Latcher |
| 105,148 A | 7/1870 | Warner et al. |

(Continued)

FOREIGN PATENT DOCUMENTS

| CN | 212545102 | 2/2021 |
| CN | 216627071 | 5/2022 |

(Continued)

OTHER PUBLICATIONS

Dog Brush, posted Mar. 28, 2015 [online], [retrieved Oct. 8, 2024]. Retrieved from internet, https://www.amazon.com/SleekEZ-Original-Deshedding-Grooming-Tool/dp/B00VC8DQX2 (Year: 2015).

(Continued)

*Primary Examiner* — Michael D Jennings
(74) *Attorney, Agent, or Firm* — Sand, Sebolt & Wernow Co., LPA

(57) ABSTRACT

A pet hair removal apparatus has a plurality of engagement members. The apparatus operates in a plurality of different operational engagement position in which different engagement members contact the surface to remove pet hair from the surface depending on which operational engagement position the apparatus is positioned. In one operational engagement position, two or more engagement members, that are different types of engagement members, simultaneously contact the surface. In another operational engagement position, only one type of engagement member contacts the surface to remove pet hair from the surface.

16 Claims, 23 Drawing Sheets

(56) References Cited

U.S. PATENT DOCUMENTS

| | | |
|---|---|---|
| 1,777,522 A | 12/1904 | Links |
| 1,517,864 A | 12/1924 | Runk |
| 1,624,753 A | 4/1927 | Moreno |
| 1,760,778 A | 5/1930 | Ries |
| 2,244,077 A | 3/1938 | Neidig |
| 2,155,462 A | 4/1939 | Anderson |
| 2,194,364 A | 3/1940 | Minor |
| 2,546,577 A | 3/1951 | Young |
| 2,609,020 A | 9/1952 | Becker |
| D172,527 S | 6/1954 | Wattles |
| 2,841,811 A | 4/1956 | Carroll |
| 3,007,503 A | 11/1961 | Kuemmerling |
| 3,080,687 A | 3/1963 | Gross |
| 3,160,142 A | 12/1964 | Torow |
| 3,229,317 A | 1/1966 | Linenfelser |
| D204,724 S | 5/1966 | Bieger |
| 3,457,579 A | 7/1969 | Shea |
| D214,977 S | 8/1969 | Roth |
| 3,488,764 A | 1/1970 | Welsh |
| 3,511,468 A | 5/1970 | Young |
| 3,574,885 A | 4/1971 | Jones |
| 3,611,468 A | 10/1971 | Michael |
| 3,707,012 A | 12/1972 | Lane |
| D226,142 S | 1/1973 | Brainerd et al. |
| D231,036 S | 3/1974 | Brainerd et al. |
| D231,039 S | 3/1974 | Brainerd et al. |
| D231,041 S | 3/1974 | Brainerd et al. |
| D233,586 S | 11/1974 | Kopp |
| 3,864,778 A | 2/1975 | Vopat |
| 3,892,247 A | 7/1975 | Andersen |
| 4,004,317 A | 1/1977 | Beedle |
| D243,382 S | 2/1977 | Mox et al. |
| 4,042,995 A | 8/1977 | Varon |
| 4,064,588 A | 12/1977 | Cooper |
| 4,254,738 A | 3/1981 | Stanley |
| 4,367,798 A * | 1/1983 | Sabol .................. A01K 13/002 168/48.1 |
| 4,597,179 A | 7/1986 | Goforth |
| 4,866,806 A | 9/1989 | Bedford |
| 4,970,990 A | 11/1990 | Wilhelmi |
| D312,893 S | 12/1990 | Hansen |
| 4,984,326 A | 1/1991 | Horie et al. |
| 4,989,511 A | 2/1991 | Clarke |
| 5,072,746 A | 12/1991 | Kantor |
| 5,074,027 A | 12/1991 | Alivar et al. |
| D323,896 S | 2/1992 | Alcazar |
| 5,101,530 A | 4/1992 | Hansen et al. |
| 5,312,197 A | 5/1994 | Abramson |
| 5,321,868 A | 6/1994 | Coulson |
| 5,349,716 A | 9/1994 | Millar |
| D352,432 S | 11/1994 | Monroe |
| D366,762 S | 2/1996 | Ward |
| 5,690,057 A | 11/1997 | Curry |
| D388,569 S | 12/1997 | Israel |
| 5,836,034 A | 11/1998 | Galvan Garza |
| 5,865,945 A | 2/1999 | Mcconaughy |
| D407,161 S | 3/1999 | Daugherty et al. |
| D417,324 S | 11/1999 | Farls |
| 5,987,687 A | 11/1999 | Kilburn |
| 6,023,811 A | 2/2000 | Ciarrocchi |
| D422,124 S | 3/2000 | Rimback |
| 6,237,181 B1 | 5/2001 | Onuffer |
| 6,336,428 B1 | 1/2002 | Locke |
| 6,367,421 B1 | 4/2002 | Deacon |
| 6,367,422 B1 * | 4/2002 | Wilhelmi ............. A01K 13/002 119/633 |
| D461,281 S | 8/2002 | Lee |
| 6,453,970 B1 | 9/2002 | Stone et al. |
| D470,981 S | 2/2003 | Simon |
| 6,516,490 B1 | 2/2003 | Hatala |
| D485,075 S | 1/2004 | Hutchinson |
| D488,898 S | 4/2004 | Ben-Moshe |
| 6,796,000 B2 | 9/2004 | Varner |
| 6,874,446 B2 | 4/2005 | Plante et al. |
| D506,587 S | 6/2005 | Armaly |
| D507,682 S | 7/2005 | Dunn et al. |
| D520,994 S | 5/2006 | Weiher et al. |
| 7,210,188 B1 * | 5/2007 | Kirby .................. A47L 13/16 15/244.4 |
| D548,907 S | 8/2007 | Killen |
| D556,966 S | 12/2007 | Herbrand |
| D557,333 S | 12/2007 | Giannola |
| D568,050 S | 5/2008 | Huang |
| D577,160 S | 9/2008 | Simon |
| 7,418,761 B2 | 9/2008 | Armaly, Jr. |
| D578,718 S | 10/2008 | Bettanin |
| 7,454,813 B2 | 11/2008 | Kaltenegger |
| 7,543,352 B2 | 6/2009 | Schaaf |
| D609,916 S | 2/2010 | Benson et al. |
| 7,757,336 B2 | 7/2010 | Varner |
| D624,262 S | 9/2010 | Gringer |
| D625,064 S | 10/2010 | Lee |
| D627,530 S | 11/2010 | Benson et al. |
| D630,615 S | 1/2011 | Lee |
| D639,788 S | 6/2011 | Borregaard |
| D667,187 S | 9/2012 | Sowinski |
| D675,799 S | 2/2013 | Beij |
| D692,145 S | 10/2013 | Al-Ali et al. |
| D703,879 S | 4/2014 | Green |
| 8,967,157 B2 | 3/2015 | Steiner |
| D742,497 S | 11/2015 | D'Amico |
| D749,203 S | 2/2016 | D'Amico |
| D758,741 S | 6/2016 | Sussman |
| D768,946 S | 10/2016 | Anderson |
| 9,474,250 B1 | 10/2016 | Tipton |
| D781,693 S | 3/2017 | Roan et al. |
| D805,376 S | 12/2017 | Heindl |
| D813,481 S | 3/2018 | Jack et al. |
| D814,727 S | 4/2018 | Wehrlie |
| 9,943,884 B2 | 4/2018 | Viola |
| D816,446 S | 5/2018 | Schluter |
| D816,447 S | 5/2018 | Schluter |
| D817,560 S | 5/2018 | Tipton |
| D818,642 S | 5/2018 | Hogan |
| 10,065,611 B1 | 9/2018 | Alonzo et al. |
| D835,858 S | 12/2018 | Tipton |
| D837,464 S | 1/2019 | Park |
| D840,121 S | 2/2019 | Becattini, Jr. et al. |
| 10,278,364 B2 | 5/2019 | Chen |
| D891,710 S | 7/2020 | Zhang |
| 10,772,296 B2 | 9/2020 | Riman |
| D919,199 S | 5/2021 | Xu |
| D933,369 S | 10/2021 | Park |
| D935,706 S | 11/2021 | Takla |
| D939,154 S | 12/2021 | Tang et al. |
| 11,253,086 B1 | 2/2022 | Huang |
| D965,305 S | 10/2022 | Yan et al. |
| D975,376 S | 1/2023 | Becattini, Jr. et al. |
| 12,004,483 B2 * | 6/2024 | Becattini, Jr. ...... A46B 15/0081 |
| 2004/0052570 A1 | 3/2004 | McKay |
| 2004/0194728 A1 | 10/2004 | Dunn et al. |
| 2005/0034263 A1 | 2/2005 | Killen |
| 2005/0087084 A1 | 4/2005 | Gray |
| 2005/0184099 A1 | 8/2005 | McKay |
| 2005/0241661 A1 | 11/2005 | Eddinger et al. |
| 2006/0042035 A1 | 3/2006 | Liu |
| 2006/0118137 A1 * | 6/2006 | Freidell ............... A01K 13/001 134/21 |
| 2006/0207042 A1 * | 9/2006 | Di Paolo ............. A47L 13/34 15/160 |
| 2007/0101946 A1 * | 5/2007 | Penny ................. A01K 13/002 119/709 |
| 2007/0130713 A1 | 6/2007 | Chen et al. |
| 2008/0066690 A1 | 3/2008 | Rosen |
| 2008/0098550 A1 | 5/2008 | McKay |
| 2009/0101076 A1 * | 4/2009 | Khubani ............. A01K 13/002 119/611 |
| 2009/0188061 A1 | 7/2009 | Cyubulski et al. |
| 2009/0229070 A1 | 9/2009 | Medema et al. |
| 2010/0154367 A1 | 6/2010 | Luo et al. |
| 2010/0294210 A1 | 11/2010 | Dyson et al. |
| 2011/0258790 A1 | 10/2011 | Cole |
| 2012/0055416 A1 * | 3/2012 | Forgues ............. A01K 13/002 119/633 |

(56) References Cited

U.S. PATENT DOCUMENTS

| | | | |
|---|---|---|---|
| 2012/0159726 A1* | 6/2012 | Ross | A46B 15/0055 |
| | | | 15/104.002 |
| 2013/0008388 A1 | 1/2013 | Chancy | |
| 2013/0061813 A1 | 3/2013 | Dionne | |
| 2014/0230172 A1 | 8/2014 | Resh | |
| 2015/0026903 A1* | 1/2015 | Holley | A47K 7/026 |
| | | | 15/144.4 |
| 2015/0047576 A1 | 2/2015 | Dauphin | |
| 2015/0059656 A1 | 3/2015 | Jui-Tsang | |
| 2016/0073612 A1* | 3/2016 | Cafasso | A45D 24/00 |
| | | | 119/633 |
| 2017/0071156 A1 | 3/2017 | Cafasso | |
| 2017/0252780 A1 | 9/2017 | Viola | |
| 2017/0280680 A1* | 10/2017 | Czajkowski | A01K 13/002 |
| 2018/0332820 A1 | 11/2018 | Murrihy et al. | |
| 2019/0150694 A1 | 5/2019 | Sullivan | |
| 2020/0015564 A1* | 1/2020 | Richardson | A45D 19/06 |
| 2020/0229419 A1* | 7/2020 | Jemail | A01L 11/00 |
| 2020/0329856 A1 | 10/2020 | Huang | |
| 2020/0390226 A1* | 12/2020 | Gowen | A46B 9/028 |
| 2021/0177131 A1 | 6/2021 | Jacobowitz | |
| 2022/0361447 A1 | 11/2022 | Mahtani | |

FOREIGN PATENT DOCUMENTS

| | | |
|---|---|---|
| CN | 217884770 | 11/2022 |
| CN | 218278253 | 1/2023 |
| CN | 219047020 | 5/2023 |
| CN | 219373441 | 7/2023 |
| CN | 219460040 | 8/2023 |
| DE | 402020204302 | 4/2021 |
| GB | 6180922 | 12/2021 |
| JP | 2002335797 | 11/2002 |
| JP | 2005124508 | 5/2005 |
| JP | 2006068485 | 3/2006 |
| JP | 2007144074 | 6/2007 |
| JP | 200810440 | 5/2008 |
| JP | 2008279097 | 11/2008 |
| JP | 2016073267 | 5/2016 |
| KR | 1579159 | 12/2015 |
| KR | 1986121 | 6/2019 |
| KR | 20200122799 A | 10/2020 |
| NZ | 428555 | 5/2021 |
| WO | 2016139661 | 9/2016 |
| WO | 2017128385 | 8/2017 |
| WO | 2021080058 | 4/2021 |
| WO | D231844-001 | 10/2023 |
| WO | D231844-002 | 10/2023 |
| WO | D231844-003 | 10/2023 |

OTHER PUBLICATIONS

Pet Hair Remover, posted Jun. 11, 2021 [online], [retrieved Oct. 8, 2024]. Retrieved from internet, https://www.amazon.com/Leos-Paw-Massaging-Deshedding-Dematting/dp/B08SBL2J31 (Year: 2021).

Pet Dog Cat Hair Remover, posted Apr. 10, 2022—retrieved Sep. 9, 2024. Retrieved from internet, https://www.amazon.es/Remover-Silicone-Interior-autom%C3%B3vil-Alfombra/dp/B09W9RK99F (Year:2022).

Sizzi, posted Apr. 11, 2022—retrieved Sep. 9, 2024. Retrieved from internet, https://www.amazon.sa/-/en/SIZZI-remover—Applicator-Suitable-Cleaned/dp/BOBLGXCC71 (Year:2022).

Tangle Teezer, posted Dec. 2, 2019—retrieved Sep. 9, 2024. Retrieved from internet, https://www.amazon.com/Pet-Teezer-Shedding-Grooming-Purple/dp/B081ZQPVYQ?th=1 (Year:2019).

Youdiwadi Pro, posted Feb. 14, 2020—retrieved Sep. 9, 2024. Retrieved from internet, https://www.amazon.com/YOUDIWADI-Reuseable-Furniture-Interiors-Detailing/dp/B084TP2VCD (Year: 2020).

FurDozer Pet Hair Remover (online), Retrieved from Internet (Dec. 5, 2023), URL: https://neaterpets.com/products/furdozer-pet-hear-remover?variant=40871589281862 (3pages) (Year: No Date Available).

Neater Pet Brands FurDozer X3 (online), (dated Nov. 17, 2022) Retrieved from Internet (Dec. 5, 2023), URL: https://www,amazon.com/dp/BOBG8TFN92 (5 pages) (Year: 2022).

Abramson, Cleaning Reddit Agrees: You Need a Carpet Squeegee, Like Yesterday [online], Jun. 12, 2021, [retrieved on Dec. 12, 2023]. Retrieved from internet: https://www.apartmenttherapy.com/carpet-squeegee-cleaning-hair-36811125.

International Search Report, PCT/US23/71078, Mail Date Nov. 14, 2023.

CarPET Car Pet Hair Remover (online), Retrieved from Internet (Dec. 6, 2023), URL: https://www.amazon.com/dp/B001CG85E4 (2 pages) (Year: 2010).

* cited by examiner

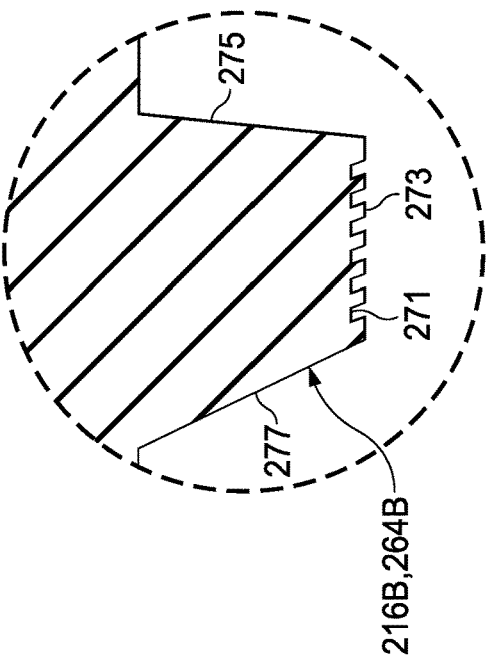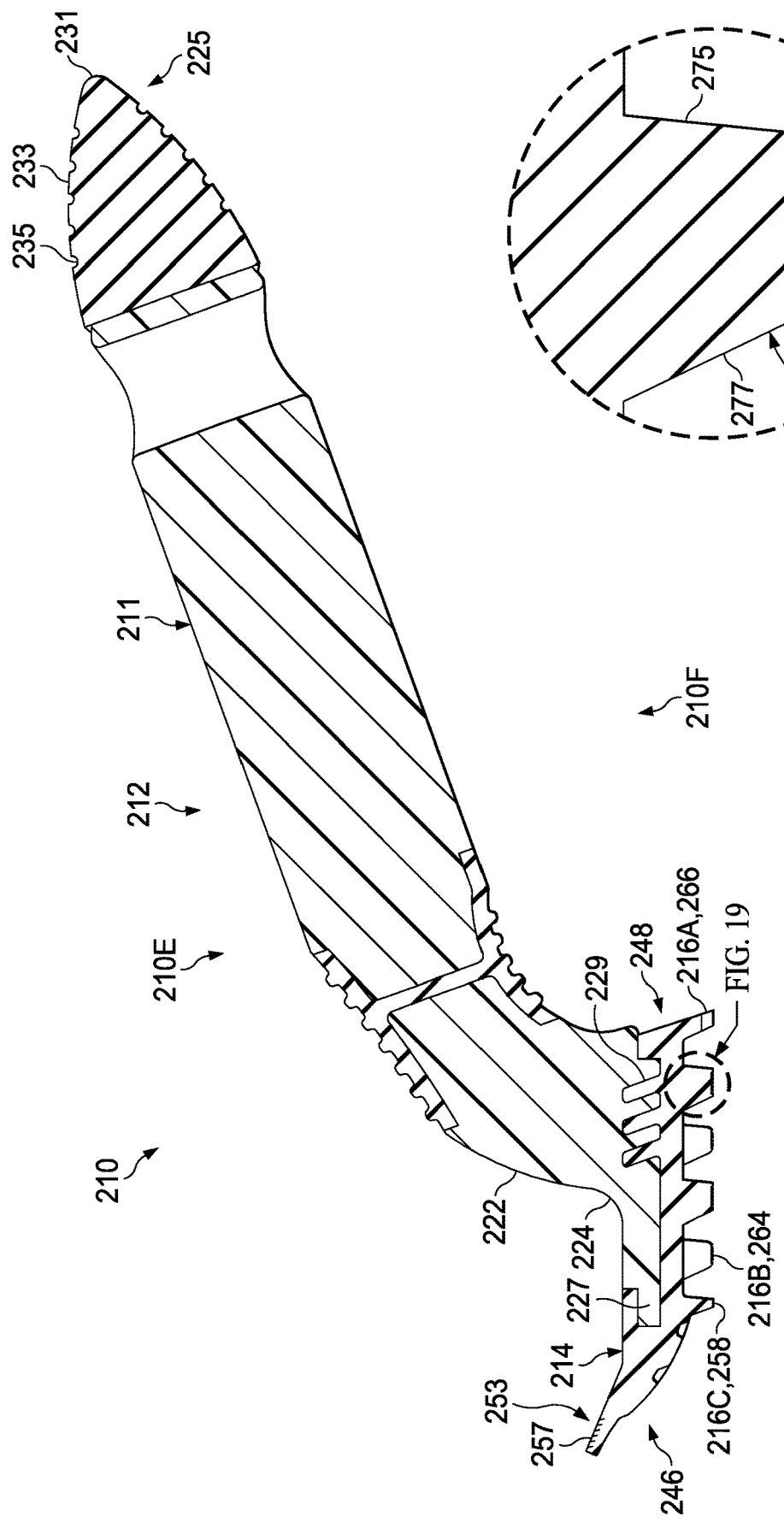
FIG. 18
FIG. 19

METHOD AND APPARATUS FOR PET HAIR REMOVAL

CROSS REFERENCE TO RELATED APPLICATIONS

This application claims the benefit of U.S. Provisional Application Ser. No. 63/217,860, filed on Jul. 2, 2021; the disclosure of which is incorporated herein by reference.

TECHNICAL FIELD

The present disclosure relates generally to a method and apparatus for pet hair removal. More particularly, the present disclosure relates to a method and apparatus for pet hair removal from fabrics and/or surfaces. Specifically, the present disclosure relates to a method and apparatus for pet hair removal from fabrics and/or surfaces with improved performance based, at least in part, on a plurality of engaging members and a plurality of engagement positions.

BACKGROUND

Pet owners often enjoy the companionship associated with their pets, such as, for example, cats or dogs. However, many pets shed their hair around a person's home, including on fabrics and/or surfaces and/or the like. Once the pet's hair ends up on the surfaces and/or fabrics and/or the like, it is typically difficult to remove.

SUMMARY

Thus, a need continues to exist for a pet hair removal apparatus with improved performance based, at least in part, on a plurality of engaging members and a plurality of engagement positions.

In accordance with one aspect of the present disclosure a pet hair removal apparatus, comprising: a body; a handle member of the body; a base member of the body; a plurality of engaging members adapted to engage various fabrics or surfaces; and a plurality of engagement positions; wherein at least one of the plurality of engaging positions is different from another of the plurality of engaging positions.

In accordance with one aspect, an exemplary embodiment of the present disclosure may provide a pet hair removal apparatus comprising: a handle; a base member connected to the handle; a plurality of engagement members on the base member, wherein the plurality of engagement members is adapted to engage a surface, and wherein the plurality of engagement members includes a first engagement member and a second engagement member; and a plurality of operational engagement positions of the base member, wherein the plurality of operational engagement positions includes a first engagement position and a second engagement position; wherein when the base member is in the first operational engagement position, both the first engagement member and the second engagement member contact the surface and the base member is oriented at a first orientation relative to the surface; wherein when the base member is in the second operational engagement position, only one of the first engagement member and the second engagement member contact the surface and the base member is at a second orientation relative to the surface; and wherein the first operational engagement position is different from the second operational engagement position. In this exemplary embodiment or another exemplary embodiment, the present disclosure may further provide a third engagement member in the plurality of engagement members; a third operational engagement position of the base member; and wherein when the base member is in the third operational engagement position, only the third engagement member contacts the surface and the base member is oriented at a third orientation relative to the surface; wherein the third operational engagement position is different from the first and second operational engagement positions. In this exemplary embodiment or another exemplary embodiment, the present disclosure may further provide a fourth engagement member in the plurality of engagement members; a fourth operational engagement position of the base member; and wherein when the base member is in the fourth operational engagement position, only the fourth engagement member contacts the surface and the base member is oriented at a fourth orientation relative to the surface; wherein the fourth operational engagement position is different from the first, second, and third operational engagement positions. In this exemplary embodiment or another exemplary embodiment, the present disclosure may further provide a fifth engagement member in the plurality of engagement members; a fifth operational engagement position of the base member; and wherein when the base member is in the fifth operational engagement position, only the fifth engagement member contacts the surface and the base member is oriented at a fifth orientation relative to the surface; wherein the fifth operational engagement position is different from the first, second, third, and fourth operational engagement positions. In this exemplary embodiment or another exemplary embodiment, the present disclosure may further provide a sixth engagement member in the plurality of engagement members; a sixth operational engagement position of the base member; and wherein when the handle and the base member is in the sixth operational engagement position, only the sixth engagement member contacts the surface and the base member is oriented at a sixth orientation relative to the surface; wherein the sixth operational engagement position is different from the first, second, third, fourth, and fifth operational engagement positions.

In this exemplary embodiment or another exemplary embodiment, the present disclosure may further provide a lower surface of the first engagement member, wherein the lower surface of the first engagement member is serrated. In this exemplary embodiment or another exemplary embodiment, the present disclosure may further provide a lower surface of the second engagement member, wherein second engagement member is a frustum that projects downwardly from a portion of the base member and terminates at the lower surface of the second engagement member. In this exemplary embodiment or another exemplary embodiment, the present disclosure may further provide a serrated or striated lower surface of the second engagement member.

This exemplary embodiment or another exemplary embodiment, the present disclosure may further provide a third engagement member in the plurality of engagement members; wherein the third engagement member is a first squeegee extending laterally between first and second sides of the base member. In this exemplary embodiment or another exemplary embodiment, the present disclosure may further provide a third engagement member in the plurality of engagement members; a fourth engagement member in the plurality of engagement members, wherein the fourth engagement member is defined by a running-bond configuration formed in a convex surface of the base member.

This exemplary embodiment or another exemplary embodiment, the present disclosure may further provide a third engagement member in the plurality of engagement members, wherein the third engagement member is a first squeegee; a fourth engagement member in the plurality of engagement members; and a fifth engagement member in the plurality of engagement members, wherein the fifth engagement member is a second squeegee extending laterally between first and second sides of the base member, wherein the fifth engagement member is positioned above the first, second, third, and fourth engagement members when viewed in a side elevation view.

This exemplary embodiment or another exemplary embodiment, the present disclosure may further provide a third engagement member in the plurality of engagement members; a fourth engagement member in the plurality of engagement members; a fifth engagement member in the plurality of engagement members; and a sixth engagement member in the plurality of engagement members, wherein the sixth engagement is defined by a pointed end of the handle. This exemplary embodiment or another exemplary embodiment, the present disclosure may further provide one or more grooves formed in the pointed end of the handle.

This exemplary embodiment or another exemplary embodiment, the present disclosure may further provide a first squeegee on the base member; a second squeegee on the base member, wherein the first squeegee and the second squeegee are disposed offset to one end of the second engagement member, and the first engagement member is dispose offset to an opposite end of the second engagement member. This exemplary embodiment or another exemplary embodiment, the present disclosure may further provide wherein the first squeegee is more rigid than the second squeegee. This exemplary embodiment or another exemplary embodiment, the present disclosure may further provide wherein when viewed in cross section along a longitudinal axis of the handle, the second squeegee is thinner than the first squeegee.

This exemplary embodiment or another exemplary embodiment, the present disclosure may further provide wherein the second engagement member is one of a plurality of second engagement members that are spaced apart and arranged in a row extending laterally from side to side of the base member. This exemplary embodiment or another exemplary embodiment, the present disclosure may further provide wherein the second engagement member.

This exemplary embodiment or another exemplary embodiment, the present disclosure may further provide an end of the handle opposite the base member; wherein the end of the handle is a conical configuration.

In yet another aspect, another exemplary embodiment of the present disclosure may provide a method for removing pet hair from a surface of an inanimate object, the method comprising: orienting a base member of a pet hair removal apparatus in a first operational engagement position relative to a surface of the inanimate object in which a first engagement member and a second engagement member simultaneously contact the surface; pulling a handle of the pet hair removal apparatus in a direction relative to the surface; lifting the handle and base member away from the surface; and orienting the base member of the pet hair removal apparatus in a second operational engagement position relative to the surface of the inanimate object in which only one of the first engagement member and the second engagement member contacts the surface. This exemplary embodiment or another exemplary embodiment, the present disclosure may further provide orienting the base member of the pet hair removal apparatus in a third operational engagement position relative to the surface of the inanimate object in which only a third engagement member contacts the surface. This exemplary embodiment or another exemplary embodiment, the present disclosure may further provide orienting the base member of the pet hair removal apparatus in a fourth operational engagement position relative to the surface of the inanimate object in which only a fourth engagement member contacts the surface. This exemplary embodiment or another exemplary embodiment, the present disclosure may further provide orienting the base member of the pet hair removal apparatus in a fifth operational engagement position relative to the surface of the inanimate object in which only a fifth engagement member contacts the surface. This exemplary embodiment or another exemplary embodiment, the present disclosure may further provide orienting the base member of the pet hair removal apparatus in a sixth operational engagement position relative to the surface of the inanimate object in which only a sixth engagement member contacts the surface.

In yet another aspect, another exemplary embodiment of the present disclosure may provide a pet hair removal apparatus comprising: a handle; a base member at one end of the handle; a plurality of engagement members on the base member, wherein at least one of the engagement members from the plurality of engagement members includes a bottom surface; a plurality of striations on the bottom surface of the at least one engagement member that are adapted to remove pet hair from a surface when the handle is maneuvered. This exemplary embodiment or another exemplary embodiment may further include a transverse direction associated with the at least one engagement member that is perpendicular to the a longitudinal direction of the handle; and wherein the plurality of striations are oriented parallel to the transverse direction. This exemplary embodiment or another exemplary embodiment may further include a vertical axis associated with the at least one engagement member, wherein the plurality of striations are angled relative to the vertical axis. This exemplary embodiment or another exemplary embodiment may further include wherein the plurality of striations are angled forward or rearward. This exemplary embodiment or another exemplary embodiment may further include an upper end on one of the plurality of striations that is tilted forward of the vertical axis; and a lower end on the one of the plurality of striations that is tilted rearward of the vertical axis. This exemplary embodiment or another exemplary embodiment may further include an angle of the plurality of striations, relative to the vertical axis, in a range from about 30 to 15 degrees. This exemplary embodiment or another exemplary embodiment may further include a material forming both the at least one engagement member and the plurality of striations. This exemplary embodiment or another exemplary embodiment may further include wherein the material is selected from a polymer material or a rubber (or rubber-derived) material that is adapted to enable the plurality of striations to be flexed when the handle is maneuvered. This exemplary embodiment or another exemplary embodiment may further include a width of the at least one engagement member, wherein the plurality of striations are thinner than the width of the at least one engagement member. This exemplary embodiment or another exemplary embodiment may further include a gap defined between adjacent striations in the plurality of striations. This exemplary embodiment or another exemplary embodiment may further include wherein the plurality of striations includes a number of striations in a range from four striations to twelve striations. This exemplary embodiment or another exemplary embodiment may further include wherein the number of striations is five striations or seven striations. This exemplary embodiment or another exemplary embodiment may further include a vertical axis associated with the at least one engagement member, wherein the plurality of striations are angled relative to the vertical axis; a front surface on the at least one engagement member, wherein the front surface and the plurality striations are similarly angled relative to the vertical axis. This exemplary embodiment or another exemplary embodiment may further include a rear surface on the at least one engagement member, wherein the rear surface is at a different angle relative to the vertical axis than the front surface on the at least one engagement member.

In yet another aspect, another exemplary embodiment of the present disclosure may provide a method for removing pet hair from a surface of an inanimate object, the method comprising: orienting a base member of a pet hair removal apparatus in a first operational engagement position relative to a surface of an inanimate object; contacting an engagement member on the base member with the surface, wherein the engagement member includes a plurality of striations on a lower surface of the engagement member; pulling a handle of the pet hair removal apparatus in a direction relative to the surface; and lifting the handle and base member away from the surface. This exemplary embodiment or another exemplary embodiment may further include flexing the plurality of striations in response to pulling the handle. This exemplary embodiment or another exemplary embodiment may further include flexing the plurality of striations from a first angle to a second angle, wherein the second angle is closer to parallel relative to an imaginary vertical axis associated with the engagement member. This exemplary embodiment or another exemplary embodiment may further include capturing the pet hair in gaps defined between adjacent striations in the plurality of striations.

In yet another aspect, another exemplary embodiment of the present disclosure may provide a pet hair removal apparatus comprising: a handle having first end and a second end; an engagement member having a pointed tip, wherein the second end of the handle is defined by the pointed tip of the engagement member that is adapted to remove pet hair from a surface; and a base member at the first end of the handle having other engagement members for removing pet hair from the surface. This exemplary embodiment or another exemplary embodiment may further include an outer surface of the engagement member having a pointed tip, wherein the outer surface is a conical configuration. This exemplary embodiment or another exemplary embodiment may further include wherein the outer surface is convexly curved. This exemplary embodiment or another exemplary embodiment may further include an outer surface of the engagement member having a pointed tip, wherein the outer surface is interrupted by at least one groove. This exemplary embodiment or another exemplary embodiment may further include a longitudinal axis associated with the handle, wherein the at least one groove extends circumferentially around the longitudinal axis. This exemplary embodiment or another exemplary embodiment may further include wherein the at least one groove is only a single groove extending spirally around the longitudinal axis. This exemplary embodiment or another exemplary embodiment may further include a plurality of grooves spaced apart from each other, wherein the at least one groove is one of the plurality of grooves. This exemplary embodiment or another exemplary embodiment may further include a number of grooves in the plurality of grooves that is in a range from four grooves to seven grooves. This exemplary embodiment or another exemplary embodiment may further include wherein there are five grooves. This exemplary embodiment or another exemplary embodiment may further include a concavely curved surface on the at least one groove defining a channel adapted to capture and remove pet hair from the surface.

In yet another aspect, another exemplary embodiment of the present disclosure may provide a method for removing pet hair from a surface of an inanimate object, the method comprising: inverting a handle of a pet hair removal apparatus to an operational engagement position relative to a surface of an inanimate object such that a base member is above an end of the handle and the base member is spaced apart from the surface, wherein the end of the handle is defined by a pointed tip; contacting the pointed tip on the handle with the surface; pulling the handle of the pet hair removal apparatus in a direction relative to the surface; and lifting the handle and base member away from the surface. This exemplary embodiment or another exemplary embodiment may further include wherein the end of the handle includes at least one groove, further comprising: capturing pet hair in the at least one groove in response to puling the handle. This exemplary embodiment or another exemplary embodiment may further include capturing pet hair in a plurality of spaced apart and distinct grooves in response to puling the handle. This exemplary embodiment or another exemplary embodiment may further include capturing pet hair adjacent a concave surface defining the at least one groove. This exemplary embodiment or another exemplary embodiment may further include contacting the end of the handle with the surface, wherein the end of the handle has a conical configuration terminating at the pointed tip.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 18 (FIG. 18) is a longitudinal cross section view of the pet hair removal apparatus in accordance with the second embodiment of the present disclosure.

FIG. 19 (FIG. 19) is an enlarged cross section view of the region labeled "SEE FIG. 19" in FIG. 18.

Similar numbers refer to similar parts throughout the drawings.

DETAILED DESCRIPTION

Figure 1:
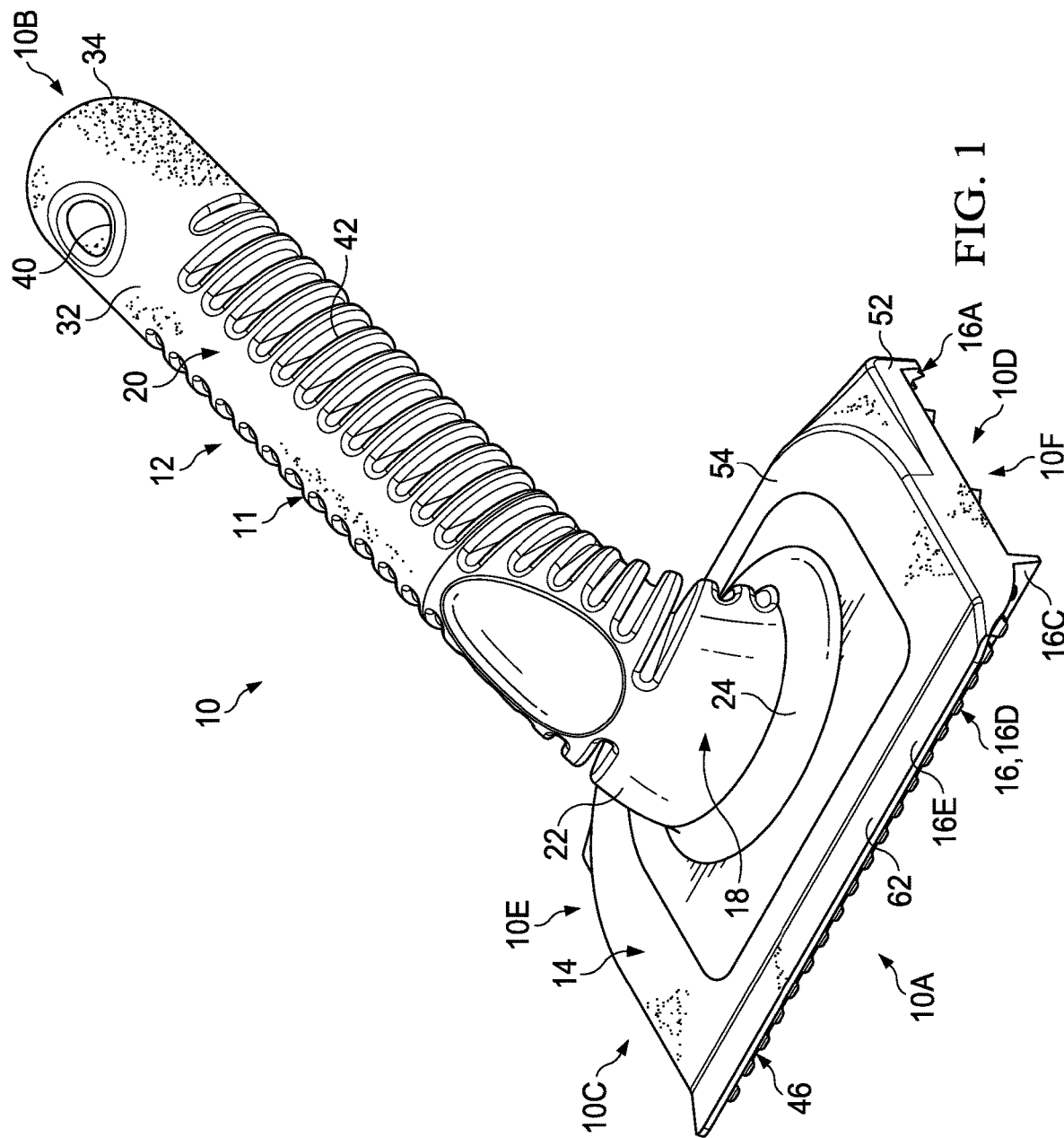
FIG. 1 (FIG. 1) is an isometric perspective view of a pet hair removal apparatus in accordance with a first embodiment of the present disclosure.
Figure 2:
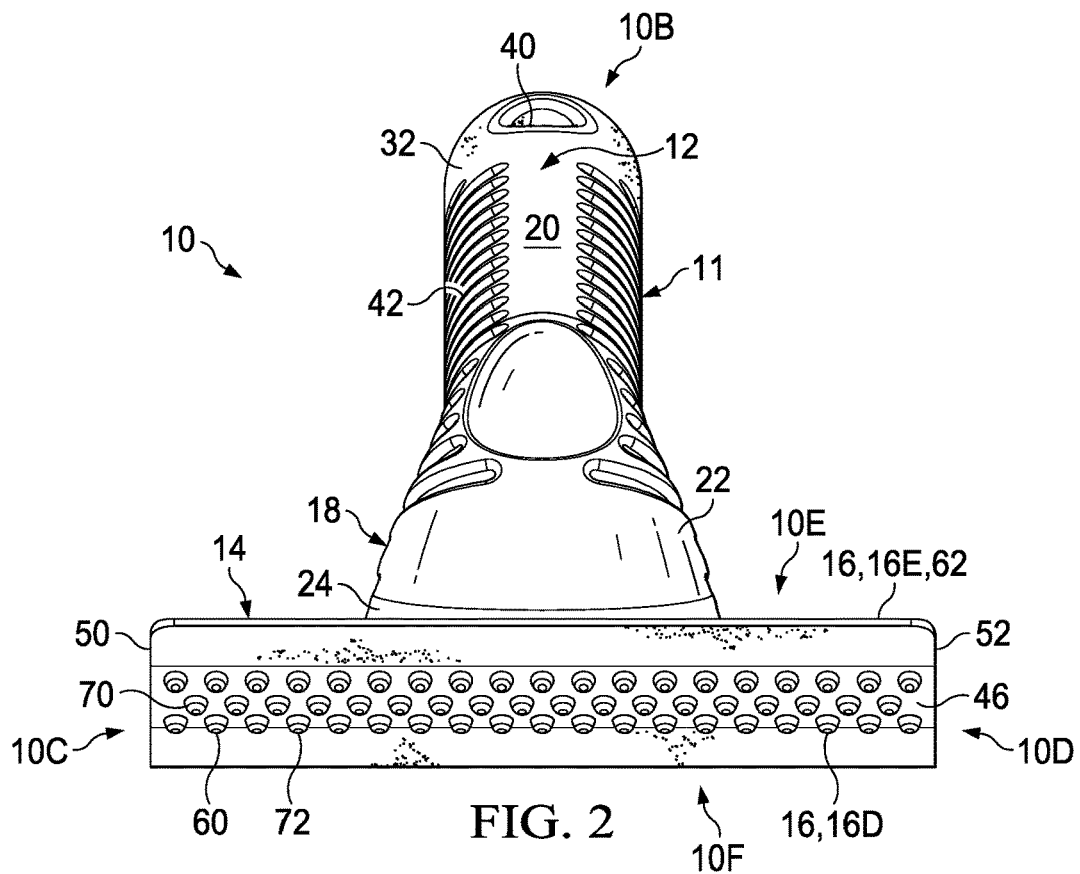
FIG. 2 (FIG. 2) is a front elevation view of the first embodiment of the pet hair removal apparatus.
Figure 3:
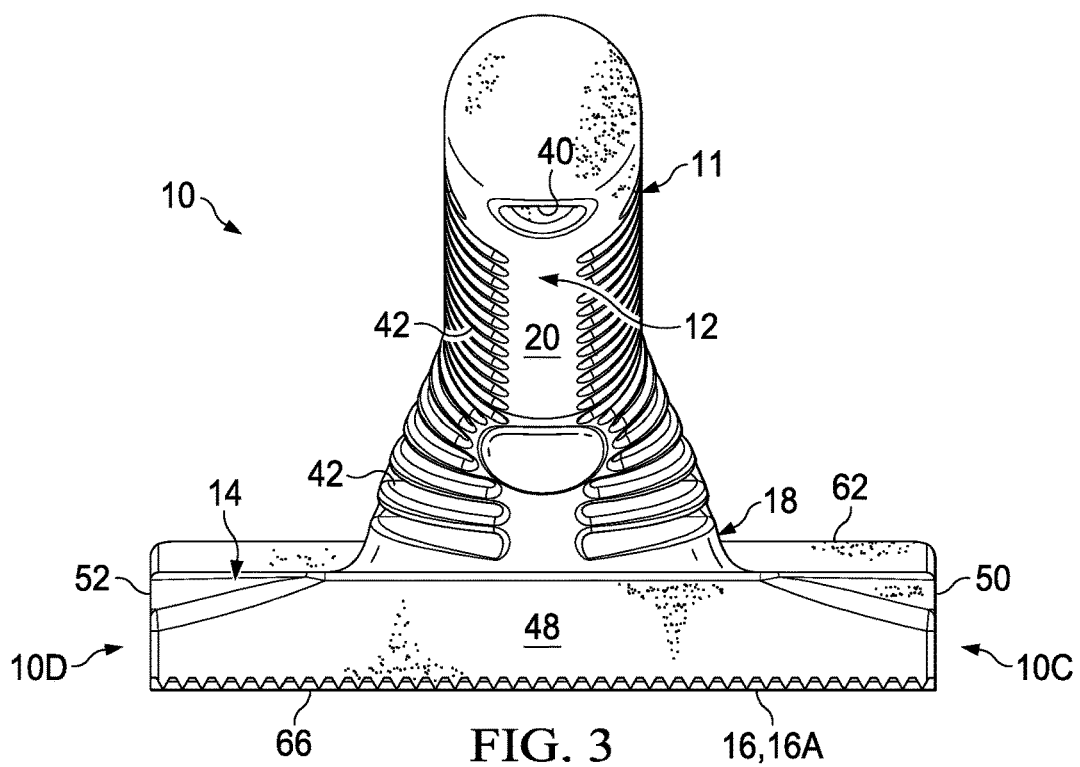
FIG. 3 (FIG. 3) is a rear elevation view of the first embodiment of the pet hair removal apparatus.
Figure 4:
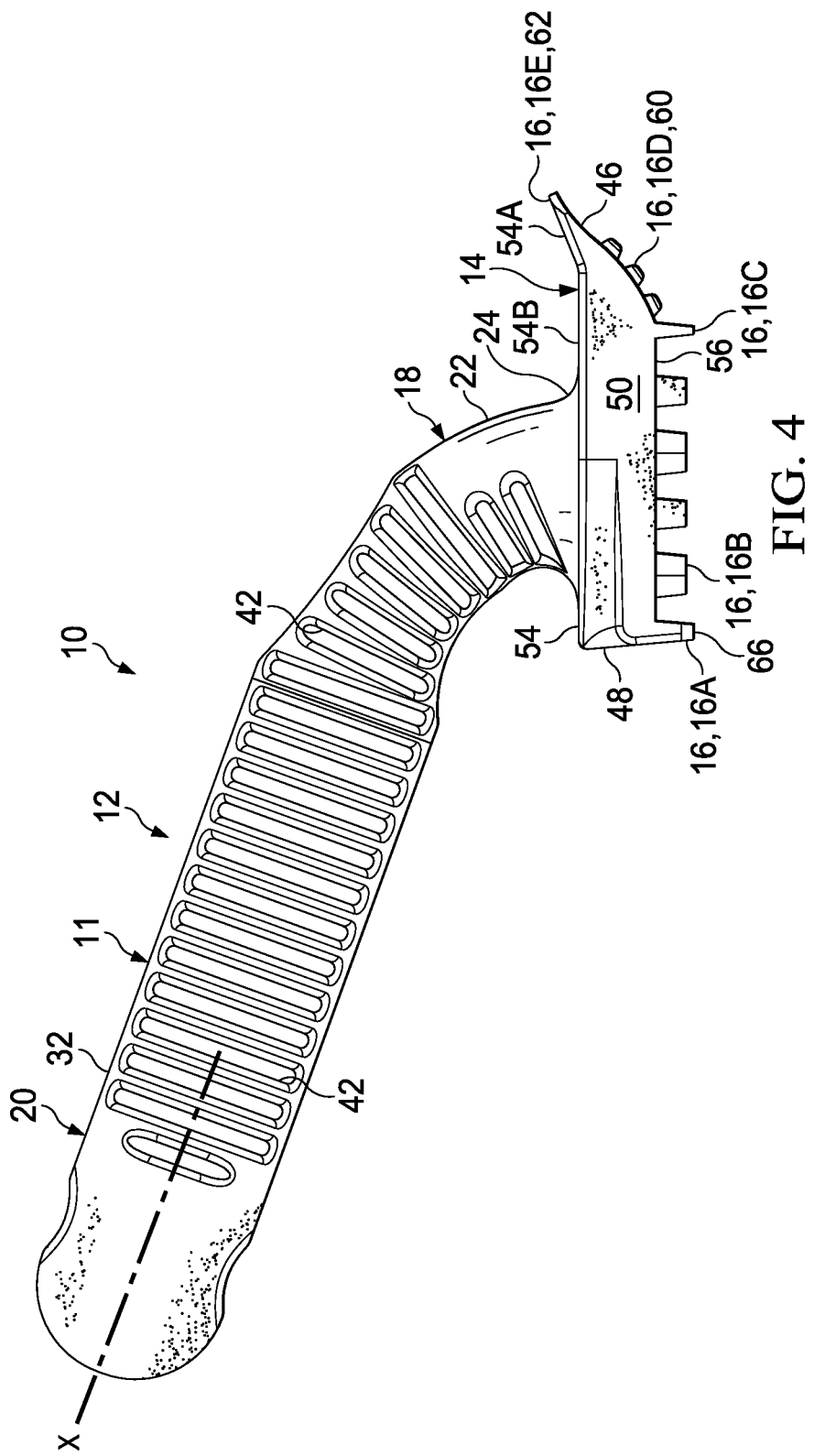
FIG. 4 (FIG. 4) is a right side elevation view of the first embodiment of the pet hair removal apparatus.
Figure 5:
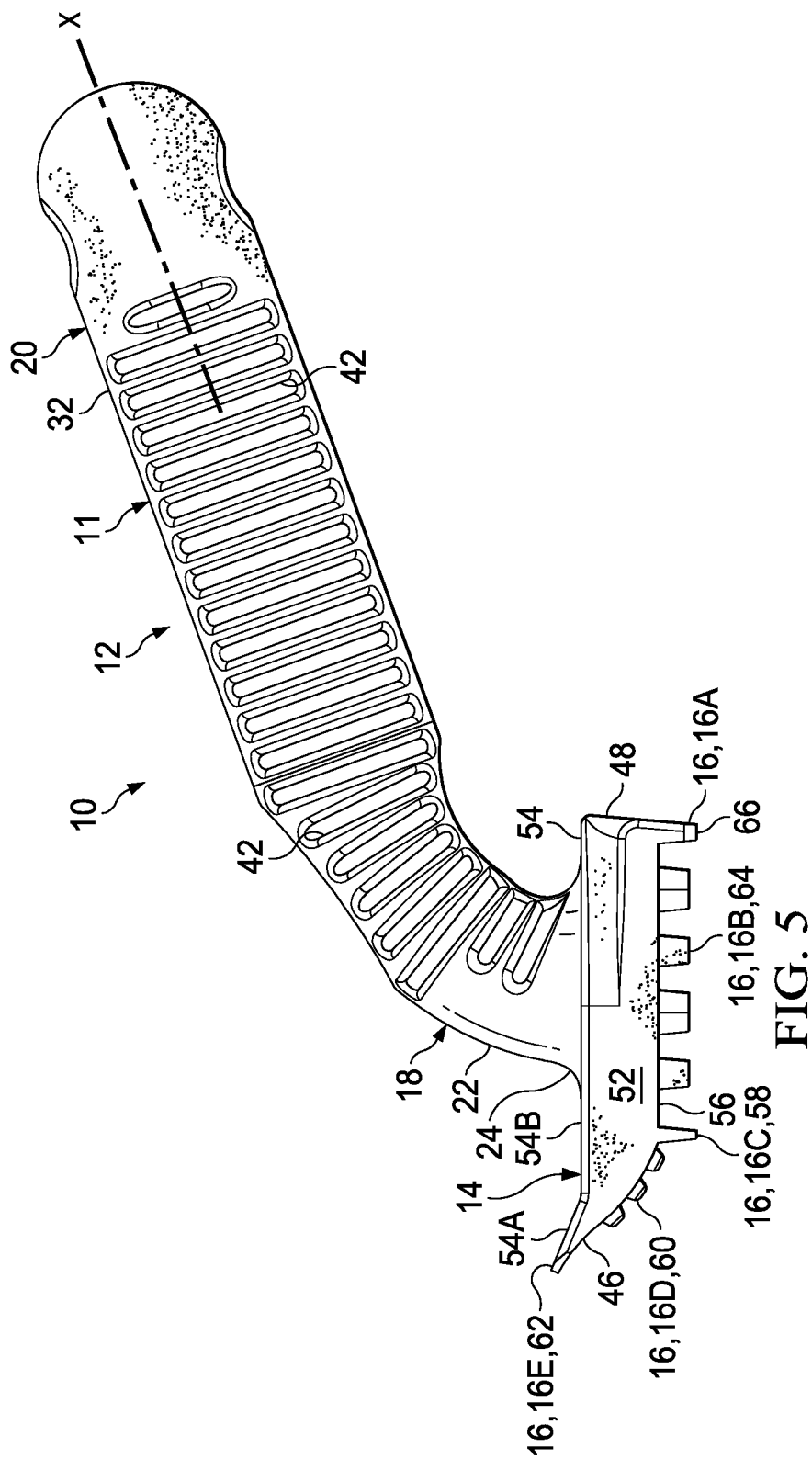
FIG. 5 (FIG. 5) is a left side elevation view of the first embodiment of the pet hair removal apparatus.
Figure 6:
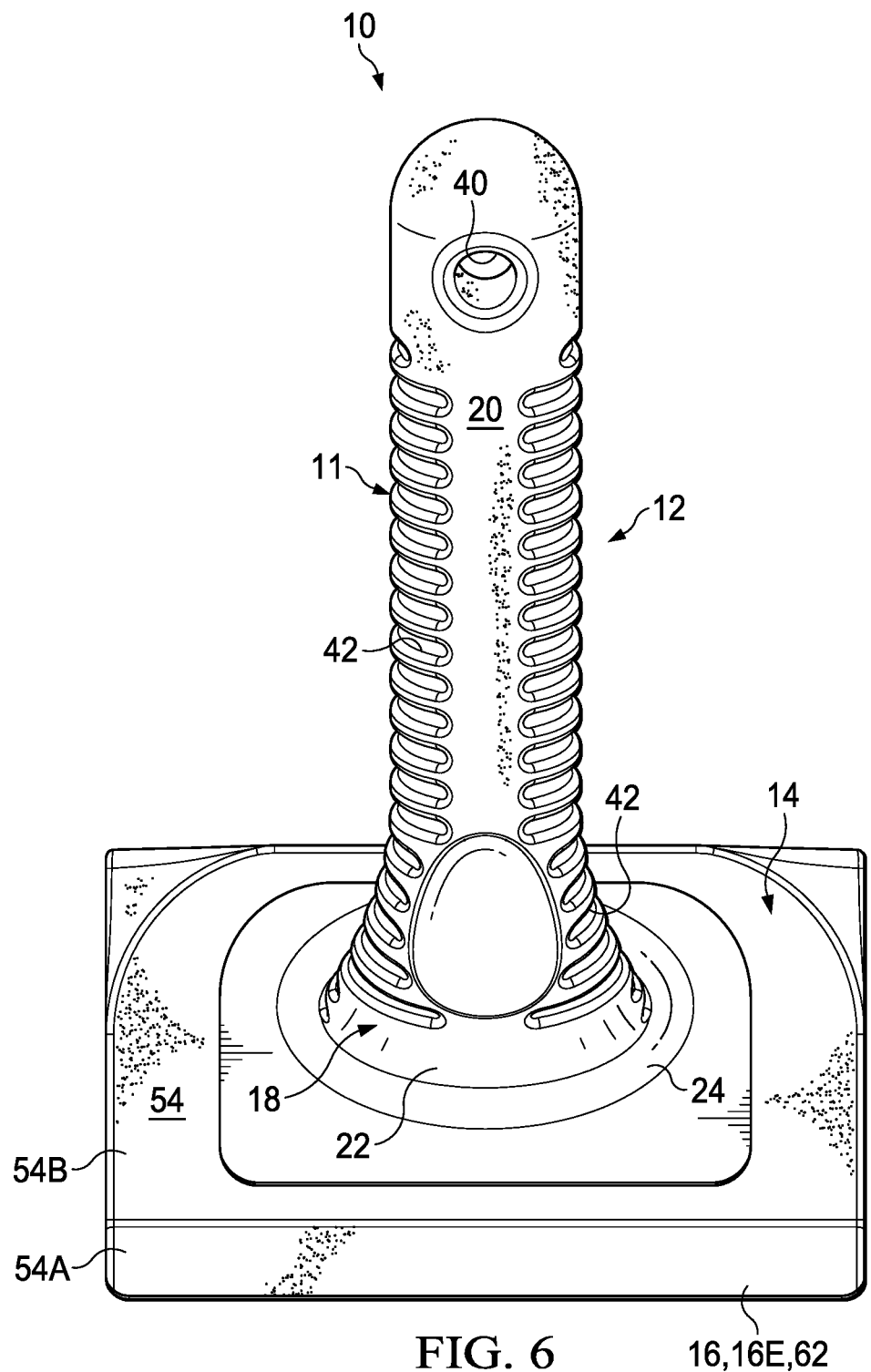
FIG. 6 (FIG. 6) is a top plan view of the first embodiment of the pet hair removal apparatus.
Figure 7:
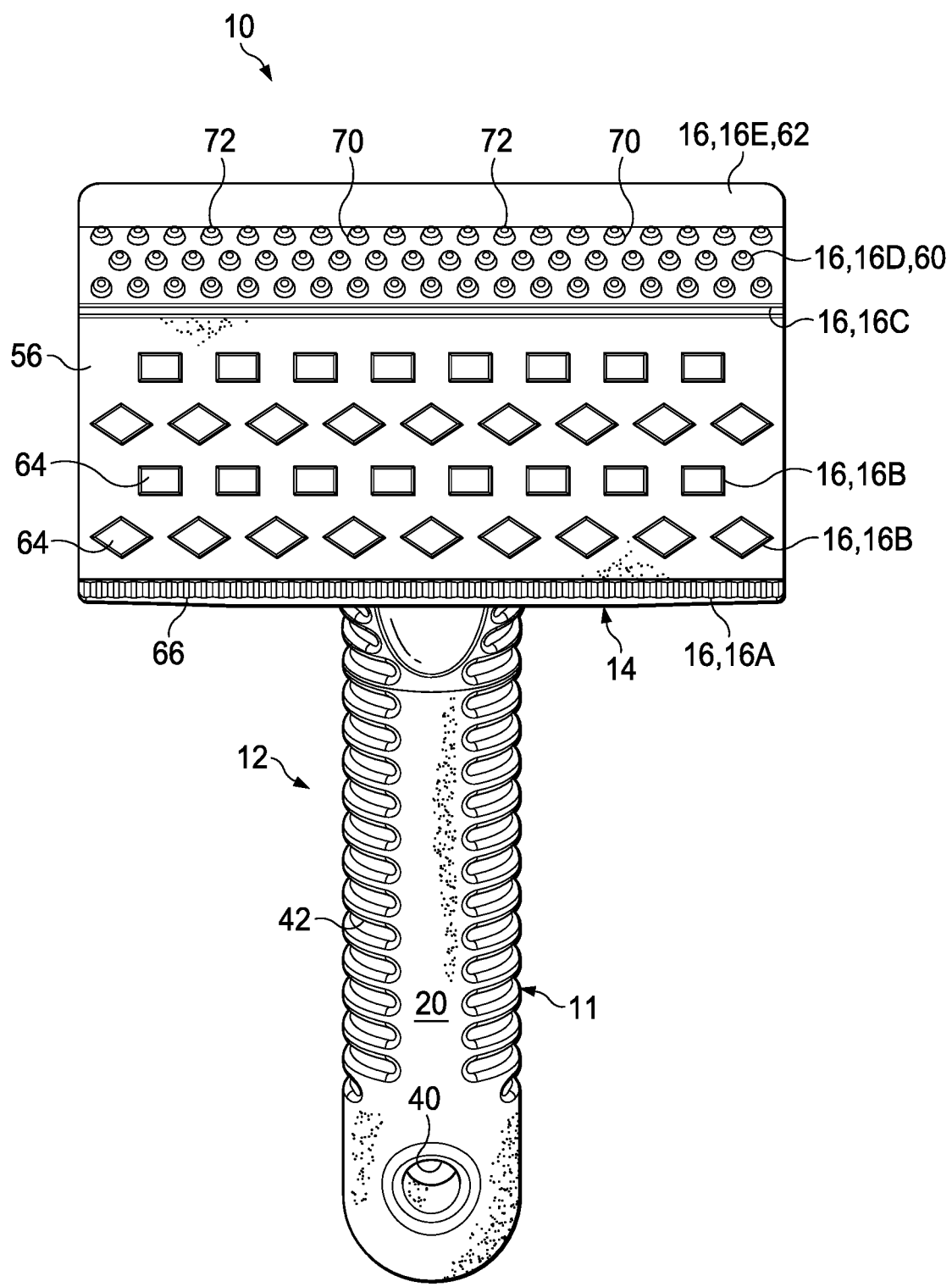
FIG. 7 (FIG. 7) is a bottom plan view of the first embodiment of the pet hair removal apparatus.
Figure 8:
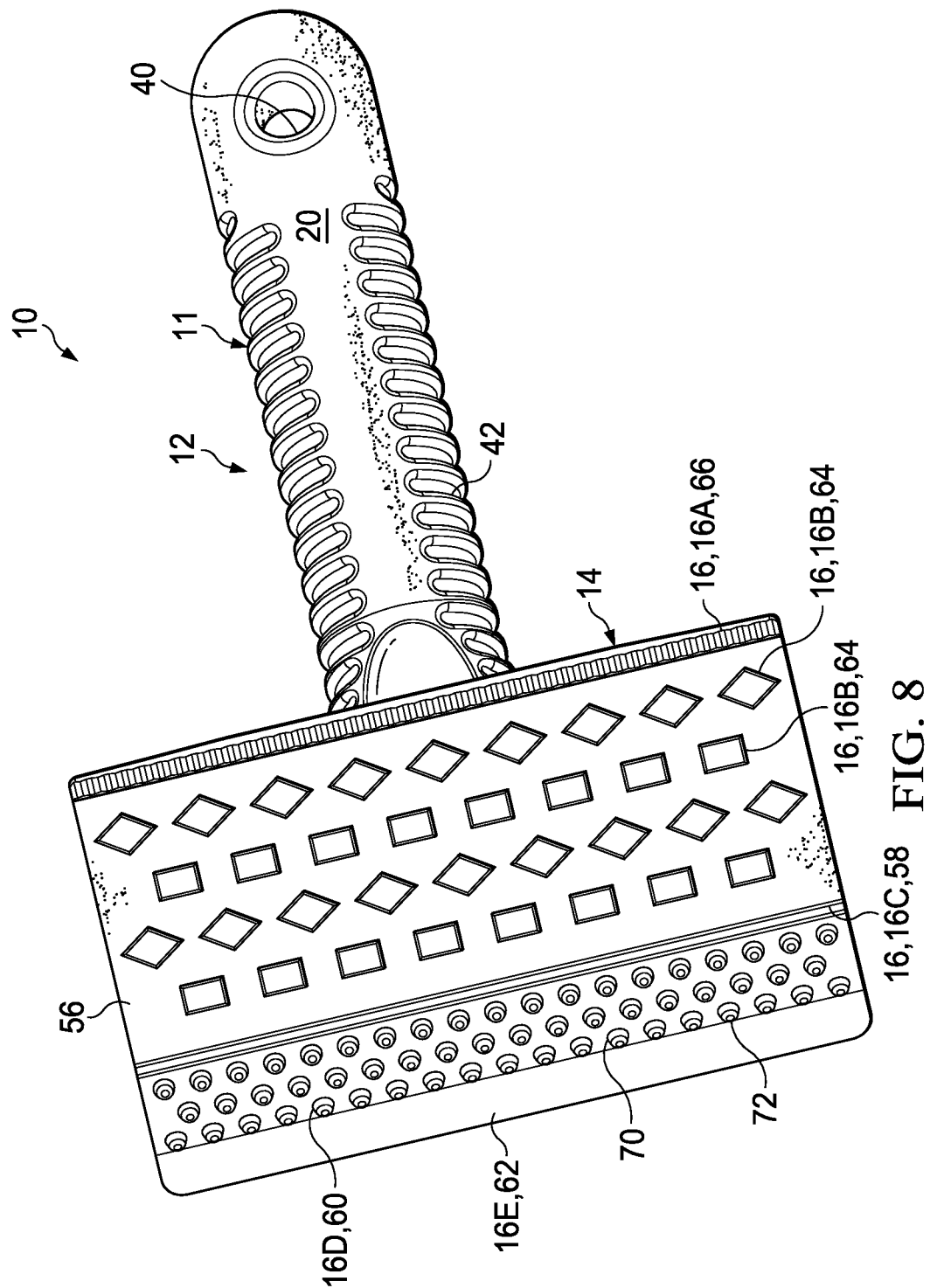
FIG. 8 (FIG. 8) is a bottom isometric perspective view of the first embodiment of the pet hair removal apparatus.

Referring to FIG. 1 through FIG. 9, there is shown a pet hair removal apparatus in accordance with one exemplary embodiment or aspect of the present disclosure, generally indicated at 10. The pet hair removal apparatus 10, which may also be referred to as apparatus 10 for brevity, may include a body 11, a handle member or handle 12, a base member 14, and a plurality of engagement members 16. One embodiment may include one or more of the following: a first engagement member 16A, a second engagement member 16B, a third engagement member 16C, a fourth engagement member 16D, and a fifth engagement member 16E.

The body 11 may be a unibody that is integrally extruded, molded, printed, or additively manufactured, removably machined, or formed as a unitary, monolithic member substantially fabricated from a rigid, manmade, material. In one example, synthetic materials, such as polymers, may form a substantial majority of the components or elements used to fabricate the body 11 and the various components integrally formed, molded, or extruded therewith. The body 11 should withstand typical pet hair removal handling from an operator pressing the body 11 against a surface or a piece of furniture without damaging the body 11. While it is contemplated that the body 11 and its additional components described herein are uniformly and integrally extruded, molded, or formed, it is entirely possible that the components of the tool body be formed separately from alternative materials as one having routine skill in the art would understand. In another example, the body 11 may be formed from an non-synthetic material configured to withstand deformation upon impact or bending by the operator. Furthermore, while the components of the body 11 are discussed below individually, it is to be clearly understood that the components and their corresponding reference elements of the body 11 are portions, regions, or surfaces of the body 11 and all form a respective element or component of the unitary body 11. Thus, while the components may be discussed individually and identified relative to other elements or components of the body 11, in this exemplary embodiment, there is a single body 11 having the below described portions, regions, or surfaces.

The apparatus 10 may include a front end 10A, a rear end 10B, a right side 10C, a left side 10D, a top 10E, and a bottom 10F. The front end 10A and the rear end 10B of the apparatus 10 define a longitudinal direction therebetween. The right side 10C and the left side 10D of the apparatus 10 define a transverse or lateral direction therebetween. The top 10E and the bottom 10F of the apparatus 10 define a vertical direction therebetween.

In some implementations, and with continued reference to FIG. 1 through FIG. 9, the handle 12 may be elongate in structure and may include a first portion 18 and a second portion 20. The first portion 18 may include a wall 22 and an end 24. The end 24 of the first portion 18 may be engaged with the base member 14.

When viewing the front end 10A of the apparatus 10, the first portion 18 may have a width that tapers toward the second portion 20. The second portion 20 may be generally cylindrical in structure, and may extend from the first portion 18 to the rear end 10B of the apparatus 10. The second portion 20 may generally define the handle 12 and may include a wall 32 and a generally arcuate top edge 34. An imaginary longitudinal axis X may extend centrally through the second portion 20.

The handle 12 may define a plurality of grip recesses 42. More particularly, the plurality of grip recesses 42 may be defined on opposing sides of the wall 22. When viewing the right side 10C of the apparatus 10, the plurality of grip recesses 42 may take on a generally elongated oval shape, and may be linearly aligned and spaced axially relative to axis X. When viewing the front end 10A of the apparatus 10, the plurality of grip recesses 42 may extend radially relative to the imaginary axis X along at least a part of the wall 22 of the first portion 18 and a part of the wall 32 of the second portion 20. An aperture 40 is defined near the terminal end of the handle 12. Aperture 40 may take the form of any configuration that enables the apparatus 10 to be hung on a retail display. Alternative to aperture 40, the end of the handle 12 could be formed with a hook to allow the apparatus 10 to be hung.

The wall 22 of the first portion 18 may further include a top finger receiving area and a bottom finger receiving area. The top finger receiving area may take on an egg shape or ellipse configuration, may face vertically upward, and may be disposed proximate the second portion 20. The bottom finger receiving area may take on an egg shape or ellipse configuration, may face vertically downward, and may be disposed proximate the second portion 20.

The base member 14 may include a front surface 46, a rear surface 48, a right side surface 50, a left side surface 52, a top surface 54, a bottom surface 56, and at least one base connecting mechanism (not shown). The top surface 54 may define a cavity (not shown) and at least one base connecting mechanism (not shown) configured to receive and secure the end 24 of the first portion 18 when the apparatus 10 is not formed as a unitary structure. The cavity may include a sidewall (not shown) and a bottom surface (not shown). The at least one base connecting mechanism may be provided within the sidewall of the cavity (i.e., channels defined by the sidewall of the cavity) and/or provided on the bottom surface of the cavity (i.e., base connecting members engaged with and extending away from the bottom surface of the cavity).

In some implementations, the sidewall of the end 24 of the first portion 18 may be complementary in shape to the sidewall of the cavity, the at least one connecting mechanism may be connecting members engaged with the sidewall of the end 24 of the first portion 18 and apertures defined by bottom surface of the end 24 of the first portion 24, and the at least one base connecting mechanism may be channels defined by the sidewall of the cavity and connecting members engaged with and extending away from the bottom surface of the cavity. In this implementation, the connecting members of the end 24 of the first portion 18 may be received within the channels of the cavity, and the base connecting members of the cavity may be received within the apertures of the bottom surface of the end 24 of the first portion 18 via an over molding process.

In some implementations and with respect to the plurality of engaging members 16, the first engagement member 16A may include a serrate surface 66, the second engagement member 16B may include lugs or protrusions or frustums 64, the third engagement member 16C may include a first squeegee 58, the fourth engagement member 16D may include front lug members 60, and the fifth engagement member 16E may include a second squeegee 62. The fifth engagement member 16E is positioned forwardly (i.e., more towards front surface 46) from the fourth engagement member 16D. The fourth engagement member 16D is positioned forwardly from the third engagement member 16C. The third engagement member 16C is positioned forwardly from the second engagement member 16B. The second engagement member 16B is positioned forwardly from the first engagement member 16A.

The front surface 46 may include portion of second squeegee 62 and a front lugs 60. The top surface 54 may include a squeegee portion 54a and a flat portion 54b. The squeegee portion of the front surface may meet the squeegee portion of the top surface 54 at a second squeegee edge. When viewing the right side surface 50, the squeegee portion of the front surface 46 may extend away from the squeegee edge vertically downward toward the lug member portion in a convex manner. The squeegee portion of the top surface 54 may extend vertically downward from the squeegee edge toward the flat portion at an angle relative to the flat portion of the top surface 54.

In some implementations, the front lug members 60 may be truncated cylindrical lug members. Each of the front lug members 60 may include a generally cylindrical sidewall 70 and a generally circular-shaped engaging surface 72. The front lug members 60 may be provided on the lug member portion of the front surface. More particularly, the truncated cylindrical lug members may be provided on the bottom portion of the front surface such that the truncated cylindrical lug members are positioned in laterally linear rows with adjacent rows offset from one another. A height of the truncated cylindrical lug members may be any suitable height. The number of truncated cylindrical lug members may be any suitable number.

The second squeegee 62 may be integral with the squeegee portion of the front surface and the squeegee portion of the top surface 54, and may extend transversely or laterally between the right side surface 50 and the left side surface 52. The squeegee portion may extend away from the flat portion upwardly at an angle. The second squeegee 62 may be formed by the squeegee portion of the front surface 46 and the squeegee portion of the top surface 54. The top surface 54 may include an angled portion and a flat portion. The second squeegee 62 may be formed by a portion of the front surface 46, the right side surface 50, the left side surface 52, and the top surface 54.

The flat portion of the top surface 54 may further include a front edge, a right side edge, a left side edge, and a rear edge. The rear edge may include a first arcuate portion, a straight portion, and a second arcuate portion. The angled portion of the top surface may further include a front edge, an angled right side edge, an angled left side edge, and a rear edge. The front edge of the angled portion may be provided proximate the front end of the base member 14 and may extend in a transverse direction between the angled right side edge and the angled left side edge. The angled right side edge may extend longitudinally downward at an angle from the front edge to the rear edge. The angled left side edge may extend longitudinally downward at an angle from the front edge to the rear edge. The rear edge may be provided proximate the front edge and may extend in a transverse direction between the angled right side edge and the angled left side edge.

The front edge may be provided proximate the rear edge and may extend in a transverse direction between the right side edge and the left side edge. The right side edge may extend in a longitudinal direction between the front edge and the first arcuate portion of the rear edge. The left side edge may extend in a longitudinal direction between the front edge and the second arcuate portion of the rear edge. The first arcuate portion of the rear edge may extend longitudinally in an arcuate manner to the straight portion of the rear edge. The second arcuate portion of the rear edge may extend longitudinally in an arcuate manner to the straight portion of the rear edge. The straight portion of the rear edge may extend in a transverse direction between the first arcuate portion and the second arcuate portion of the rear edge.

The right side surface of the base member 14 may include an angled edge, a straight top edge, an arcuate region, a bottom arcuate edge, a front right leg member, a straight bottom edge, and a rear right leg member. The arcuate region may include a top arcuate edge, a rear edge, a right side edge, and an arcuate surface bounded by the top arcuate edge, the rear edge and the right side edge. The front right leg member may include a top end, a bottom end, a first edge, an outer surface, and a second edge. The rear right leg member may include a top end, a bottom end, a first edge, an outer surface, and a second edge. The angled edge may be provided proximate the angled right side edge, the straight top edge may be provided proximate the right side edge, and the top arcuate edge may be provided proximate the first arcuate portion of the rear edge. The rear edge of the arcuate region may extend transversely away from the straight portion of the rear edge downward at an angle and in an arcuate manner toward the right side edge which may be provided approximately midway between the straight top edge and the straight bottom edge. The right side edge extends from the rear edge longitudinally toward the front end 10A of the body 11 until a point that is coplanar with the point that the straight top edge meets the top arcuate edge of the arcuate region. The bottom arcuate edge may include a first arcuate section, a second arcuate section, and an inflection point. The bottom arcuate edge may extend longitudinally away from the front surface downward in an arcuate manner toward first edge proximate the top end of the front right leg member such that the first arcuate section is convex and the second arcuate section is concave with the change occurring at the inflection point. The outer surface extends vertically downward from the top end to the bottom end and is bounded by the first edge and the second edge. The straight bottom edge extends longitudinally from the second edge proximate the top end of the front right leg member to the first edge proximate the top end of the rear right leg member. The outer surface extends vertically downward from the top end to the bottom end and is bounded by the first edge and the second edge. The second edge of the rear right leg member extends vertically upward toward the meeting point between the rear edge and the right side edge.

The left side surface of the base member 14 may include an angled edge, a straight top edge, an arcuate region, a bottom arcuate edge, a front left leg member, a straight bottom edge, and a rear left leg member. The arcuate region may include a top arcuate edge, a rear edge, a left side edge, and an arcuate surface bounded by the top arcuate edge, the rear edge and the left side edge. The front left leg member may include a top end, a bottom end, a first edge, an outer surface, and a second edge. The rear left leg member includes a top end, a bottom end, a first edge, an outer surface, and a second edge. The angled edge may be provided proximate the angled left side edge. The straight top edge may be provided proximate the left side edge, and the top arcuate edge 166 may be provided proximate the second arcuate portion of the rear edge. The rear edge of the arcuate region may extend transversely away from the straight portion of the rear edge downward at an angle and in an arcuate manner toward the left side edge which may be provided approximately midway between the straight top edge and the straight bottom edge. The left side edge extends from the rear edge longitudinally toward the front end 10A of the body 11 until a point that is coplanar with the point that the straight top edge meets the top arcuate edge of the arcuate region. The bottom arcuate edge may include a first arcuate section, a second arcuate section, and an inflection point. The bottom arcuate edge may extend longitudinally away from the front surface downward in an arcuate manner toward first edge proximate the top end of the front left leg member such that the first arcuate section is convex and the second arcuate section is concave with the change occurring at the inflection point. The outer surface extends vertically downward from the top end to the bottom end and is bounded by the first edge and the second edge. The straight bottom edge extends longitudinally from the second edge proximate the top end of the front left leg member to the first edge proximate the top end of the rear right leg member. The outer surface extends vertically downward from the top end to the bottom end and is bounded by the first edge and the second edge. The second edge of the rear right leg member extends vertically upward toward the meeting point between the rear edge and the right side edge. The outer surface extends vertically downward from the top end to the bottom end and is bounded by the first edge and the second edge. The second edge of the rear left leg member extends vertically upward toward the meeting point between the rear edge and the left side edge.

The front surface of base member 14 may include a top surface portion, an intermediate portion and a bottom portion. The top surface portion may include a top edge, a bottom edge, a right rounded corner, and a left rounded corner. The top edge may be provided proximate the front edge of the angled portion. The right rounded corner may be provided proximate the angled right side edge and the angled edge. The left rounded corner may be provided proximate the angled left side edge and the angled edge. The top edge may extend in a transverse direction between the right rounded corner and the left rounded corner. The bottom edge may be spaced a distance away from the top edge and may extend in a transverse direction between the right rounded corner and the left rounded corner parallel to the top edge. The intermediate portion may include a bottom edge that extends transversely between the inflection point and the inflection point. The intermediate portion may be bounded by the bottom edge, the first arcuate section of the bottom arcuate edge, the first arcuate section of the bottom arcuate edge, and the bottom edge. The bottom portion may include a bottom edge extending transversely between a point where the second arcuate section of the bottom arcuate edge meets the first edge of the front right leg member and a point where the second arcuate section of the bottom arcuate edge meets the first edge of the front left leg member. The bottom portion may be bounded by the bottom edge, the second arcuate section of the bottom arcuate edge, the second arcuate section of the bottom arcuate edge, and the bottom edge.

The rear surface of base member 14 may include a first angled top edge, a straight top edge, a second angled top edge, a first side edge, a second side edge, a bottom edge, and a bottom surface, and an inner sidewall. The first angled top edge may be provided proximate the rear edge of the arcuate region, the straight top edge may be provided proximate the straight portion of the rear edge, the second angled top edge may be provided proximate the rear edge of the arcuate region, the first side edge may extend vertically downward from a point where the right side edge meets the rear edge to the bottom edge. The second side edge may extend vertically downward from a point where the left side edge meets the rear edge to the bottom edge. The bottom edge may extend in a transverse direction between the first side edge and the second side edge. The bottom surface may extend transversely between the bottom end of the rear right leg member and the bottom end of the rear left leg member. The inner sidewall may extend in a transverse direction between the first edge of the rear right leg member and the first edge rear left leg member.

The rear right leg member of the base member 14 may include a top end, a bottom end, a first edge, an outer surface, and a second edge. The first side edge and the second side edge may be proximate to the bottom edge. The inner sidewall may include a top edge and a bottom edge, and may extend transversely between the first side edge and the second side edge proximate to the bottom edge. The bottom surface may extend longitudinally toward the top edge of the inner sidewall.

In one exemplary embodiment, the first squeegee 58 may be defined by the angled portion of the top surface, the top surface portion of the front surface, the intermediate portion of the front surface, at least a portion of the right side surface, and at least a portion of the left side surface. The first squeegee may be made of a flexible material but is still more rigid than the second squeegee.

The first squeegee 58 may include a front squeegee surface, a rear squeegee surface, and a bottom squeegee surface. The front squeegee surface of first squeegee 58 may include a top edge, a bottom edge, a right side edge, and a left side edge. The top edge may be positioned proximate to the bottom edge of the bottom portion and may extend in a transverse direction between the first edge proximate the top end and the first edge proximate the top end, the right side edge may be positioned proximate to the first edge, the left side edge may be positioned proximate to the first edge, and the bottom edge may extend in a transverse direction between the first edge proximate the bottom end and the first edge proximate the bottom end. The rear squeegee surface may include a top edge, a bottom edge, a right side edge, and a left side edge. The top edge may be coplanar with, and spaced apart from, the top edge and may extend in a transverse direction between the first edge proximate the top end and the first edge proximate the top end, the right side edge may be positioned proximate to the first edge, the left side edge may be positioned proximate to the first edge, and the bottom edge extend in a transverse direction between the first edge proximate the bottom end and the first edge proximate the bottom end. The bottom squeegee surface may be defined by, and bounded by, the bottom end, the bottom end, the bottom edge, and the bottom edge. The first squeegee may be more rigid than the second squeegee.

In some implementations, the plurality of lug members of the fourth engagement member 16D may be truncated cylindrical lug members. The truncated cylindrical lug members may include a generally cylindrical sidewall and a generally circular-shaped engaging surface. The truncated cylindrical lug members may be provided on the bottom portion of the front surface. More particularly, the truncated cylindrical lug members may be provided on the bottom portion of the front surface such that the truncated cylindrical lug members are positioned in longitudinally linearly aligned rows with adjacent rows offset from one another. A height of the truncated cylindrical lug members may be any suitable height. The number of truncated cylindrical lug members may be any suitable number.

In some implementations, the plurality of lug members of the second engagement member 16B may be truncated diamond-shaped lug members and truncated polygonal lug members. The truncated diamond-shaped lug members may include a generally diamond-shaped sidewall and a generally diamond-shaped engaging surface. The truncated polygonal lug members may include a generally polygonal-shaped sidewall and a generally polygonal-shaped engaging surface. The truncated diamond-shaped lug members and truncated polygonal lug members may be provided on the bottom surface of the base member 14. More particularly, truncated diamond-shaped lug members and truncated polygonal lug members may be engaged with the bottom surface of the base member 14 such that the truncated diamond-shaped lug members are positioned in laterally linear aligned rows and the truncated polygonal lug members are positioned in laterally linear aligned rows. In some implementations, the rows of truncated diamond-shaped lug members and the rows of truncated polygonal lug members are adjacent to and offset from one another. Stated otherwise, the rows alternate with one another in an offset manner. A height of the truncated diamond-shaped lug members and the truncated polygonal lug members may be any suitable height. The number of truncated diamond-shaped lug members and the truncated polygonal lug members may be any suitable number.

The serrated surface 66 may be provided on the bottom surface of base member 14. The serrated surface may include serrations that are coplanar linearly aligned teeth separated by voids. In some implementations, the number of serrations provided on the serrated surface 66 may be thirty, however, any suitable number of serrations may be utilized.

Having thus described the structure of the apparatus 10, and its associated components, primary reference is now made to FIG. 9 through FIG. 13 to depict exemplary implementations and operations of the apparatus 10 for removing pet hair from fabrics and/or surfaces. It should be noted that one of the benefits of the apparatus 10 of the present disclosure is that the apparatus 10 may utilize a plurality of engaging members 16 via a plurality of engagement positions to remove pet hair from a variety of fabrics and/or surfaces. In this implementation, the apparatus 10 will be described as being operable to remove pet hair 100 from a fabric surface 13. Although the apparatus 10 is described as being used with a fabric surface 13, the apparatus for removing pet hair may be utilized with any suitable fabric and/or surface and/or the like.

Figure 9:
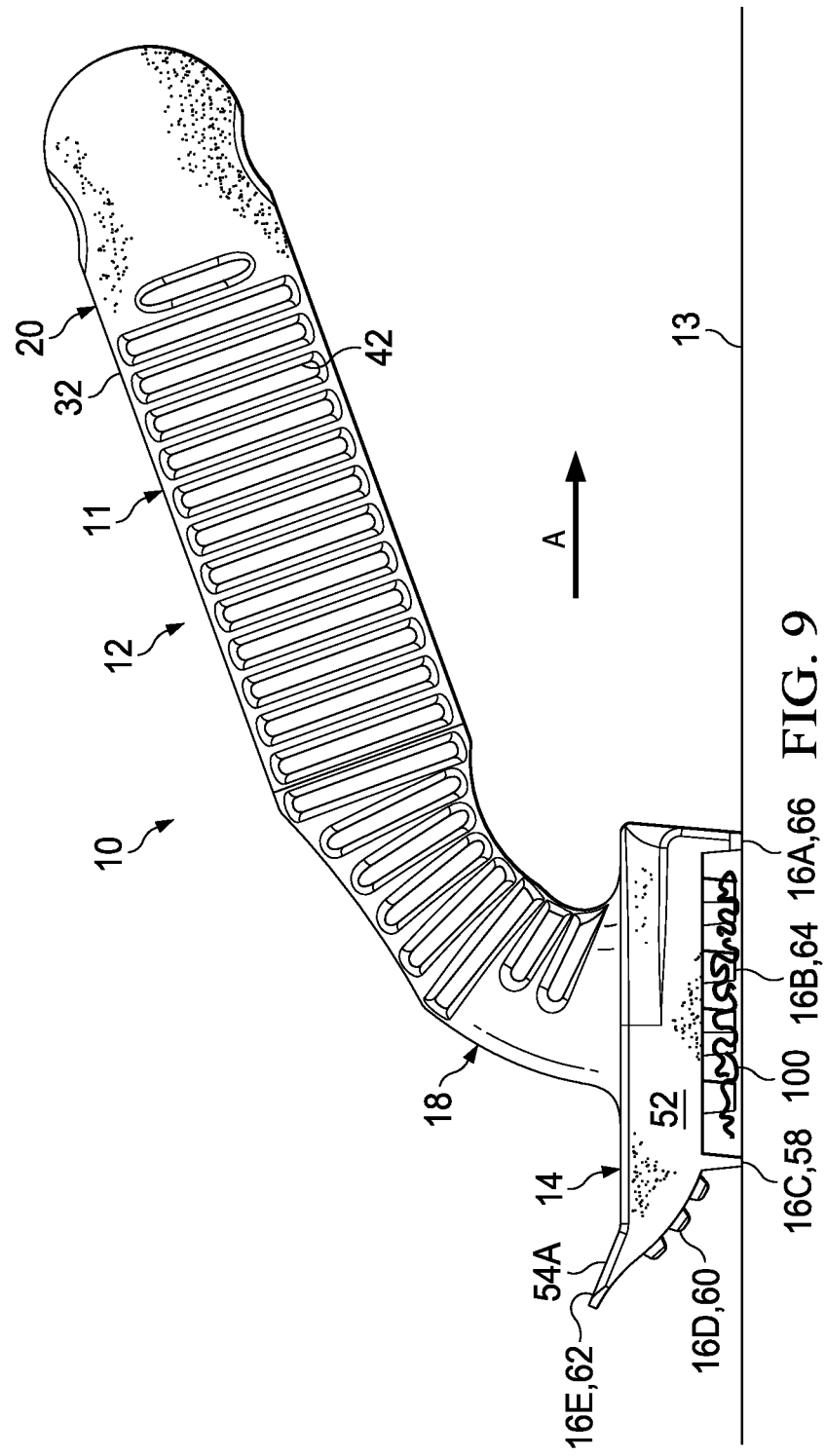
FIG. 9 (FIG. 9) is an operational view in showing one exemplary engagement position of the first embodiment of the pet hair removal apparatus in accordance with one aspect of the present disclosure.
Figure 10:
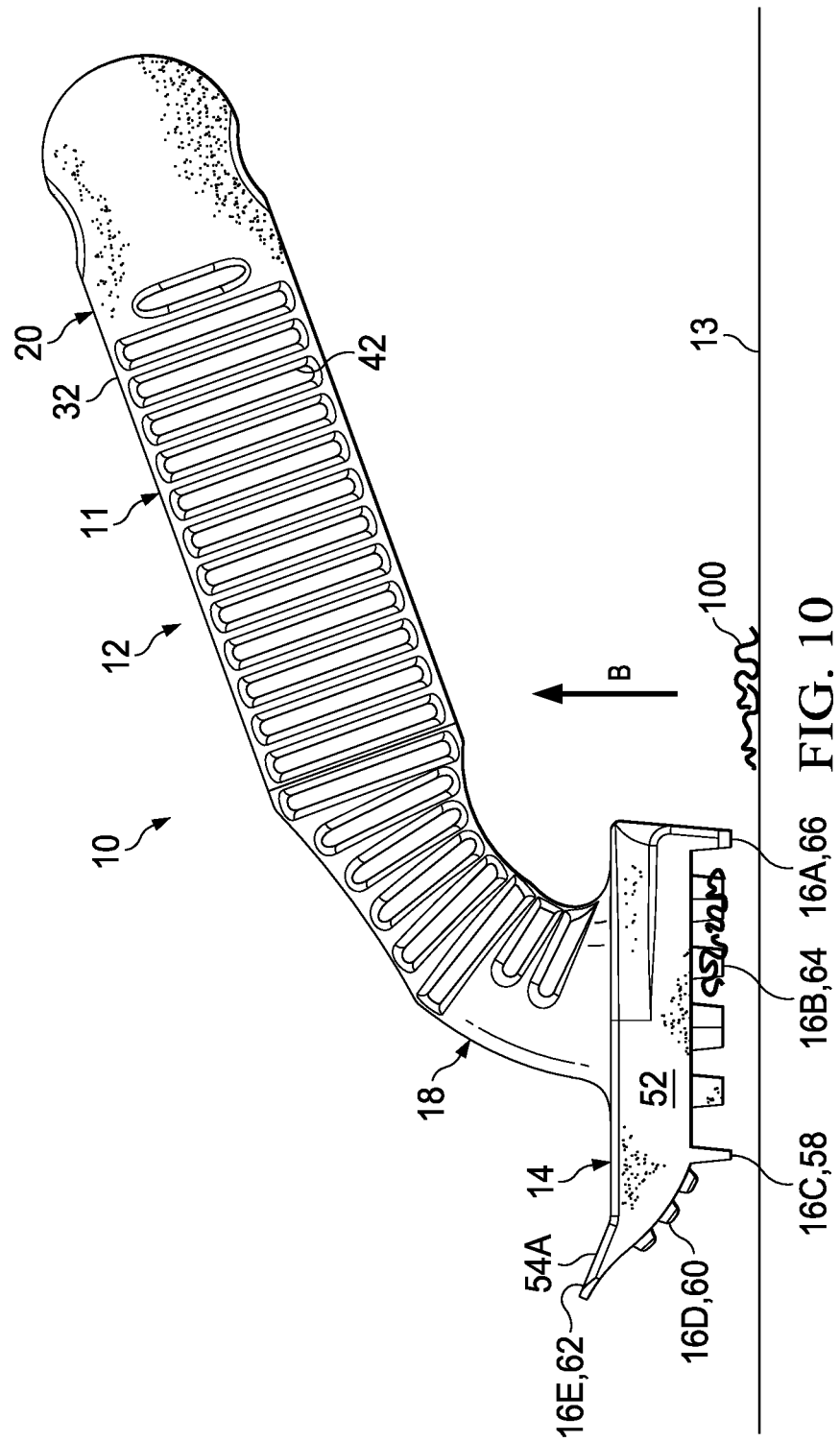
FIG. 10 (FIG. 10) is an operational view of the first embodiment of the pet hair removal apparatus in accordance with one aspect of the present disclosure.

With primary reference to FIG. 9, one exemplary operational engagement position of the apparatus 10 is shown. When this engagement position is utilized, the bottom surface of the first squeegee 58, the diamond-shaped engaging surface of the second plurality of lug members of the second engagement member 16B, the polygonal-shaped engaging surface of the second plurality of lug members of the second engagement member 16B, and the serrated surface 66 may be engaged with the fabric surface 13 to remove the pet hair 100. More particularly, an operator may manipulate the apparatus 10 via gripping portion 20 of the handle member 12. Once the operator engages the fabric surface 13, the operator moves the apparatus 10 in a direction generally indicated at arrow A such that one or more of the bottom surface of the first squeegee 66, the diamond-shaped engaging surface of the second plurality of lug members, the polygonal-shaped engaging surface of the second plurality of lug members, and the serrated surface 66 contacts and loosens and/or removes the pet hair 100 from the fabric surface 13. More particularly, and with reference to FIG. 10, after the operator moves the apparatus 10 in the direction indicated by arrow A, the operator may move the apparatus in a direction generally indicated by arrow B and the pet hair 100 may be removed from the fabric surface 13 and/or the pet hair 100 may be removed from the apparatus 10.

Figure 11:
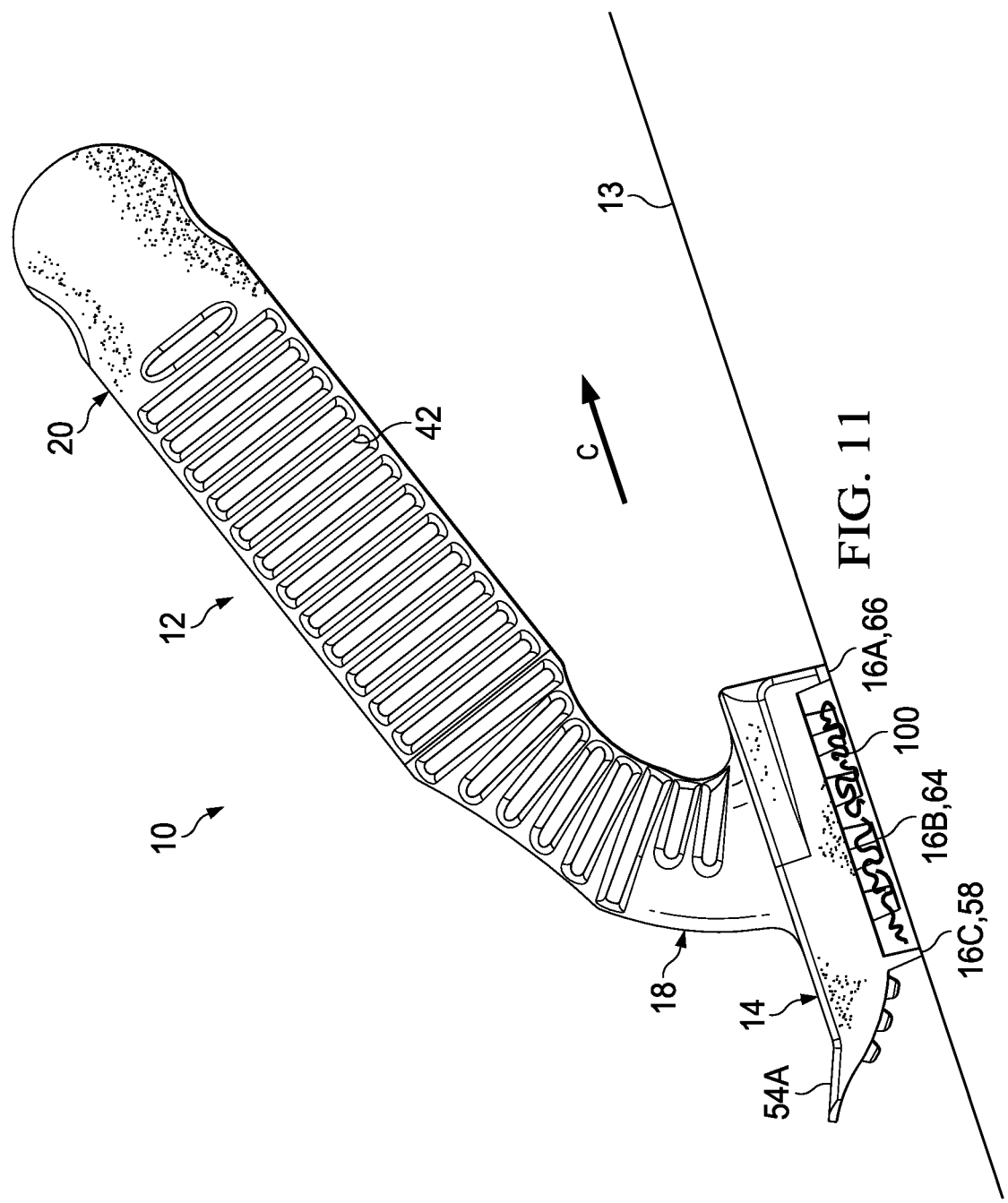
FIG. 11 (FIG. 11) is an operational view in showing one exemplary engagement position of the first embodiment of the pet hair removal apparatus in accordance with one aspect of the present disclosure.

With primary reference to FIG. 11, one exemplary operational engagement position of the apparatus 10 is shown. When this engagement position is utilized, the bottom surface of the first squeegee 58 may be engaged with the fabric surface 13 to remove the pet hair 100. More particularly, an operator may manipulate the apparatus 10 via gripping portion 20 of the handle member 12. Once the operator engages the fabric surface 13, the operator moves the apparatus 10 in a direction generally indicated at arrow C such that the bottom surface of the first squeegee 58 contacts and loosens and/or removes the pet hair 100 from the fabric surface 13. The pet hair 100 may be removed in a substantially similar manner as described in relation to FIG. 10 above.

Figure 12:
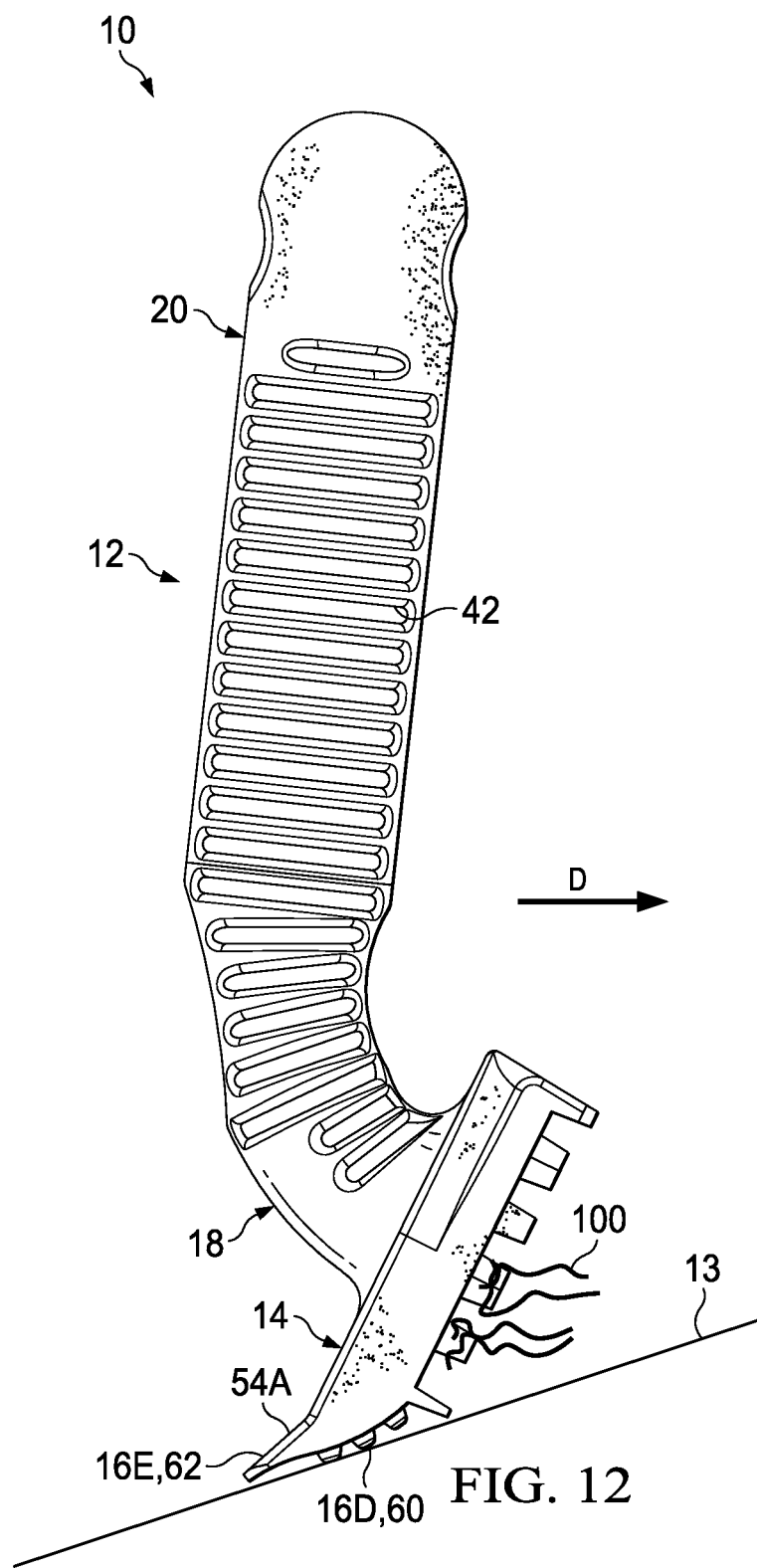
FIG. 12 (FIG. 12) is an operational view in showing one exemplary engagement position of first embodiment of the pet hair removal apparatus in accordance with one aspect of the present disclosure.

With primary reference to FIG.12, one exemplary operational engagement position of the apparatus 10 is shown. When this engagement position is utilized, the circular-shaped engaging surface of the fourth engagement members 16D may be engaged with the fabric surface 13 to remove the pet hair 100. More particularly, an operator may manipulate the apparatus 10 via gripping portion 20 of the handle member 12. Once the operator engages the fabric surface 13, the operator moves the apparatus 10 in a direction generally indicated at arrow D such that the fourth engagement member 16D contacts and loosens and/or removes the pet hair 100 from the fabric surface 13.

Figure 13:
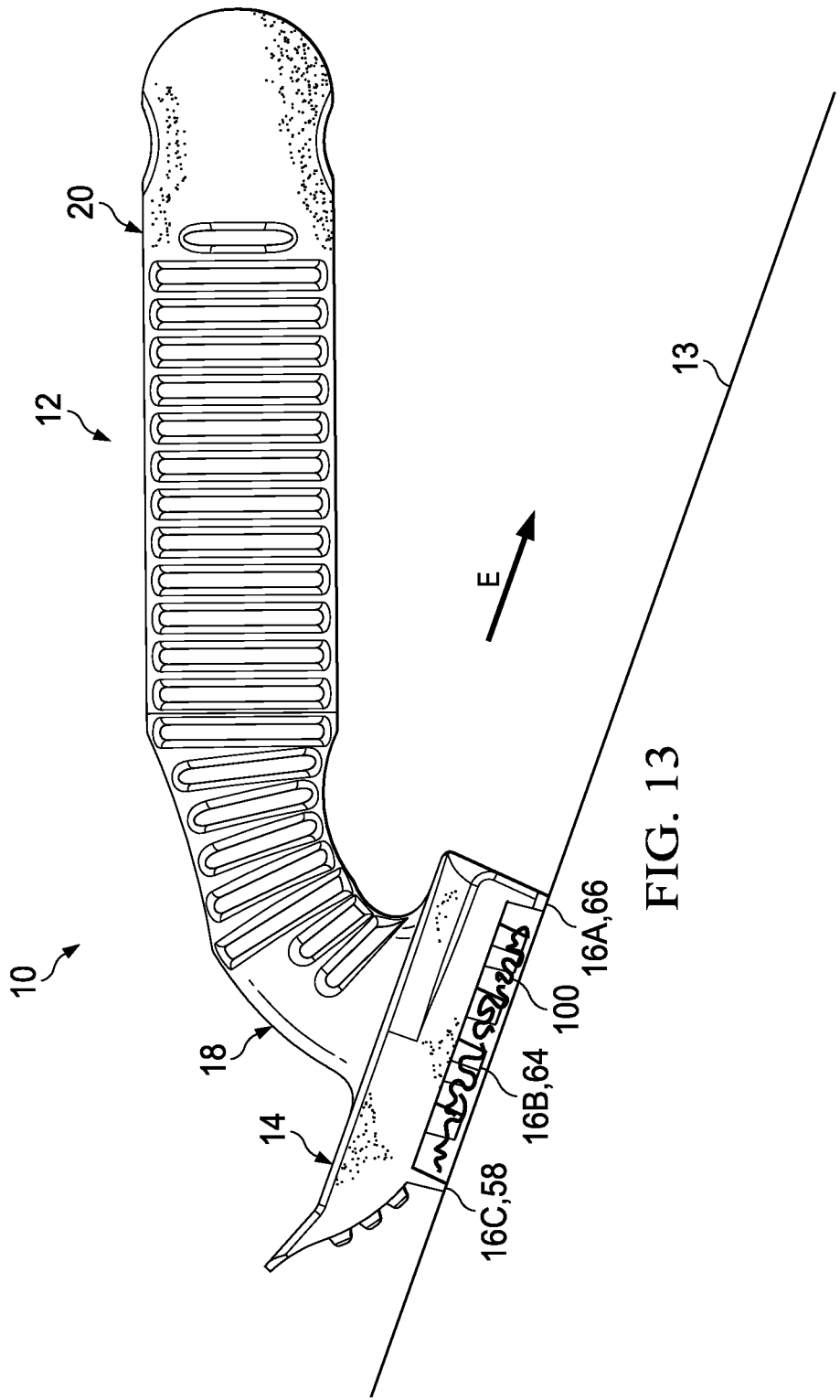
FIG. 13 (FIG. 13) is an operational view in showing one exemplary engagement position of the first embodiment of the pet hair removal apparatus in accordance with one aspect of the present disclosure.

With primary reference to FIG. 13, one exemplary operational engagement position of the apparatus 10 is shown. When this engagement position is utilized, the serrated surface 66 may be engaged with the fabric surface 13 to remove the pet hair 100. More particularly, an operator may manipulate the apparatus 10 via gripping portion 20 of the handle member 12. Once the operator engages the fabric surface 13, the operator moves the apparatus 10 in a direction generally indicated at arrow E such that the serrated surface 66 contacts and loosens and/or removes the pet hair 100 from the fabric surface 13.

Figure 14:
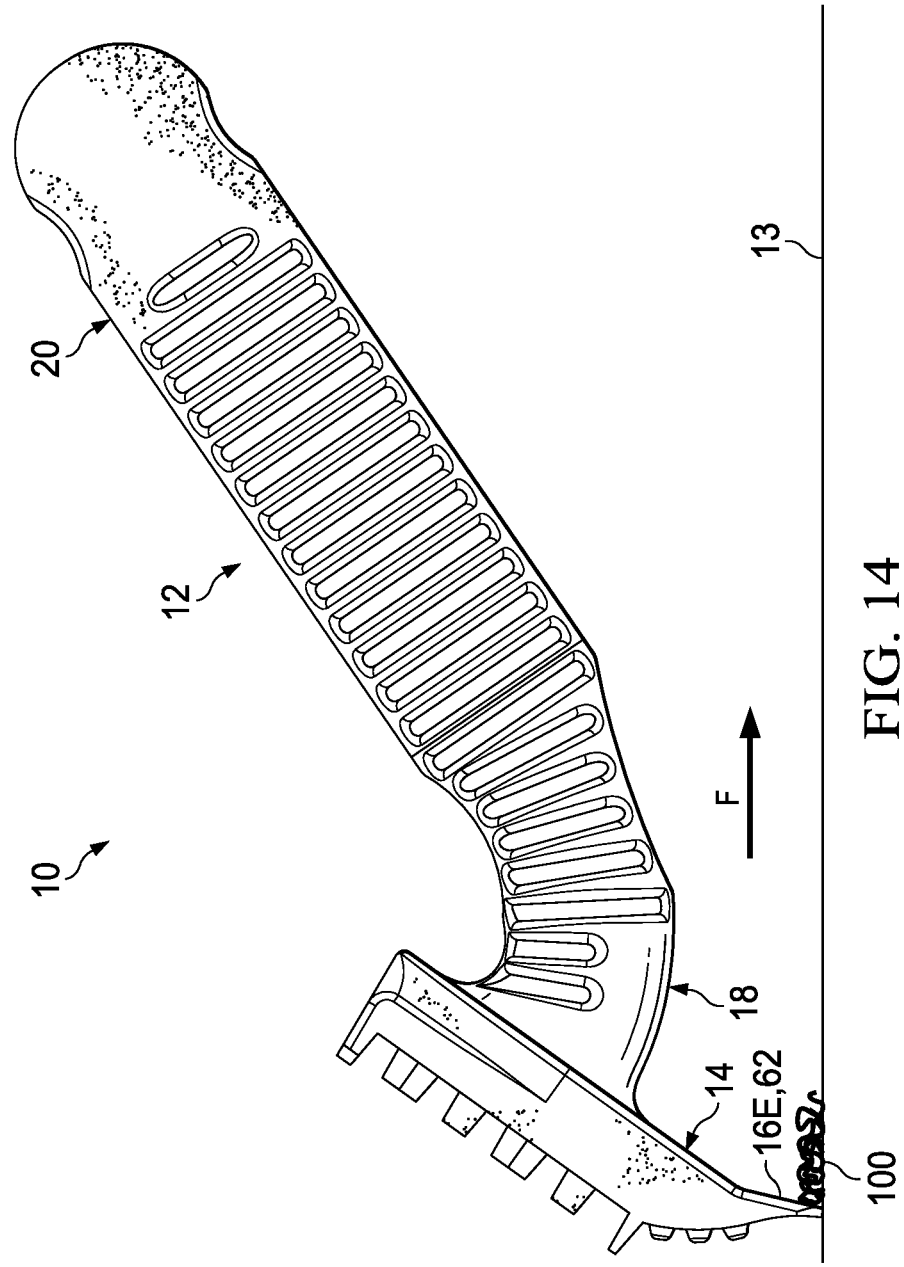
FIG. 14 (FIG. 14) is an operational view in showing one exemplary engagement position of the first embodiment of the pet hair removal apparatus in accordance with one aspect of the present disclosure.

With primary reference to FIG.14, one exemplary operational engagement position of the apparatus 10 is shown. When this engagement position is utilized, the top surface portion of the second squeegee 66 may be engaged with the fabric surface 13 to remove the pet hair 100. More particularly, an operator may manipulate the apparatus 10 via the gripping portion 20 of the handle member 12. Once the operator engages the fabric surface 13, the operator moves the apparatus 10 in a direction generally indicated at arrow F such that the top surface portion of second squeegee 66 contacts and loosens and/or removes the pet hair 100 from the fabric surface 13.

Referring to FIG. 15 through FIG. 20E, there is shown a pet hair removal apparatus in accordance with another exemplary embodiment or aspect of the present disclosure, generally indicated at 210. The pet hair removal apparatus 210, which may also be referred to as apparatus 210 for brevity, may include a body 211, a handle member or handle 212, a base member 214 that may generally take the form of a molded brush head, and a plurality of engagement members 216. One embodiment may include one or more of the following: a first engagement member 216A, a second engagement member 216B, a third engagement member 216C, a fourth engagement member 216D, a fifth engagement member 216E, and a sixth engagement member 216F. The six engagement members effectuate the removal of pet hair 100 from a surface from at least six operational engagement positions as detailed herein.

The body 211 may be a unibody that is integrally extruded, molded, printed, or additively manufactured, removably machined, or formed as a unitary, monolithic member substantially fabricated from a rigid, manmade, material. In one example, synthetic materials, such as polymers, may form a substantial majority of the components or elements used to fabricate the body 211 and the various components integrally formed, molded, or extruded therewith. The body 211 should withstand typical pet hair removal handling from an operator pressing the body 211 against a surface or a piece of furniture without damaging the body 211. While it is contemplated that the body 211 and its additional components described herein are uniformly and integrally extruded, molded, or formed, it is entirely possible that the components of the tool body be formed separately from alternative materials as one having routine skill in the art would understand. In another example, the 211 body may be formed from an non-synthetic material configured to withstand deformation upon impact or bending by the operator. Furthermore, while the components of the body 211 are discussed below individually, it is to be clearly understood that the components and their corresponding reference elements of the body 211 are portions, regions, or surfaces of the body 211 and all form a respective element or component of the unitary body 211. Thus, while the components may be discussed individually and identified relative to other elements or components of the body 211. In this exemplary embodiment, there is a single body 211 having the below described portions, regions, or surfaces, with portions of the body having been molded or over-molded relative to other portions, regions, or surfaces of other parts of body 211.

The apparatus 210 may include a front end 210A, a rear end 210B, a right side 210C, a left side 210D, a top 210E, and a bottom 210F. The front end 210A and the rear end 210B of the apparatus 210 define a longitudinal direction therebetween. The right side 210C and the left side 210D of the apparatus 210 define a transverse or lateral direction therebetween. The top 210E and the bottom 210F of the apparatus 210 define a vertical direction therebetween.

Handle 212 may be elongate in structure and may include a first portion 218, a second portion 220, and an over mold third portion 221. The first portion 218 may include a wall 222 and a first end 224. The end 224 of the first portion 218 may be engaged or integrally molded with the base member 214.

When viewing the front end 210A of the apparatus 210, the first portion 218 may have a width that tapers toward the second portion 220. The second portion 220 may be generally cylindrical in structure, and may extend from the first portion 18 to the rear end 210B of the apparatus 210. The second portion 220 may generally define the handle 212 and may include a second end or pointed end 225. An imaginary longitudinal axis X may extend centrally through the second portion 220.

The handle 212 may define a plurality of grip recesses 242. More particularly, the plurality of grip recesses 242 may be defined on opposing sides of second portion 220. When viewing the left side 210D of the apparatus 210, the plurality of grip recesses 242 may take on a generally elongated oval shape, and may be linearly aligned and spaced axially relative to axis X. When viewing the front end 210A of the apparatus 210, the plurality of grip recesses 242 may extend radially relative to the imaginary axis X along at least a part of the first portion 218, a part of the second portion 220, and a part of the over mold third portion 221. An aperture 240 is defined near the terminal end of the handle 212. Aperture 240 may take the form of any configuration that enables the apparatus 210 to be hung on a retail display. Alternative to aperture 240, the end of the handle 212 could be formed with a hook to allow the apparatus 210 to be hung.

The wall 222 of the first portion 218 may further include a top finger receiving area and a bottom finger receiving area. The top finger receiving area may take on an egg shape or ellipse configuration, may face vertically upward, and may be disposed proximate the second portion 220. The bottom finger receiving area may take on an egg shape or ellipse configuration, may face vertically downward, and may be disposed proximate the second portion 220.

The base member 214 may include a front surface 246, a rear surface 248, a right side surface, a left side surface, a top surface 254, a bottom surface 56, and optionally at least one base connecting mechanism if not molded or over molded as a uniform apparatus 210. The top surface 254 may define a cavity 227 (FIG. 18) and at least one base connecting mechanism 229 (FIG. 18) configured to secure the end 224 of the first portion 218 when the apparatus 210 is not formed as a unitary structure. The cavity may include a sidewall and a bottom surface. The at least one base connecting mechanism 229 may be provided within the sidewall the cavity 227 (i.e., channels defined by the sidewall of the cavity) and/or provided on the bottom surface that defines the cavity 227 (i.e., base connecting members engaged with and extending away from the bottom surface of the cavity).

In some implementations, the sidewall of the end 224 of the first portion 218 may be complementary in shape to the sidewall of the cavity 227, the at least one connecting mechanism 229 may be connecting members engaged with the sidewall of the end 224 of the first portion 218 and apertures defined by bottom surface of the end 224 of the first portion 218, and the at least one base connecting mechanism may be channels defined by the sidewall of the cavity and connecting members engaged with and extending away from the bottom surface of the cavity. In this implementation, the connecting members of the end 224 of the first portion 218 may be received within the channels of the cavity, and the base connecting members of the cavity may be received within the apertures of the bottom surface of the end 224 of the first portion 218 via an over molding process.

Figure 15:
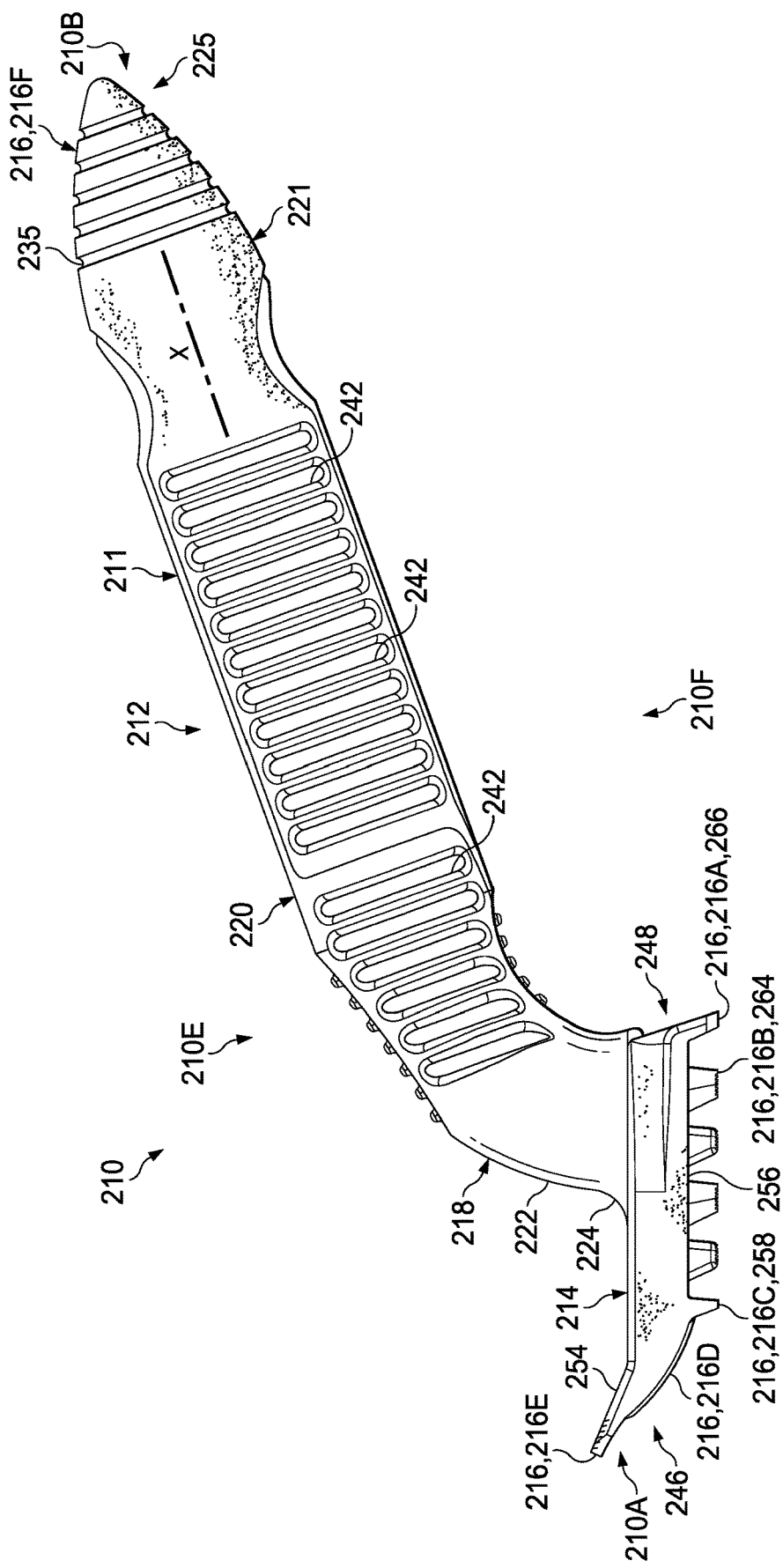
FIG. 15 (FIG. 15) is a left side elevation view of a pet hair removal apparatus in accordance with a second embodiment of the present disclosure.
Figure 16:
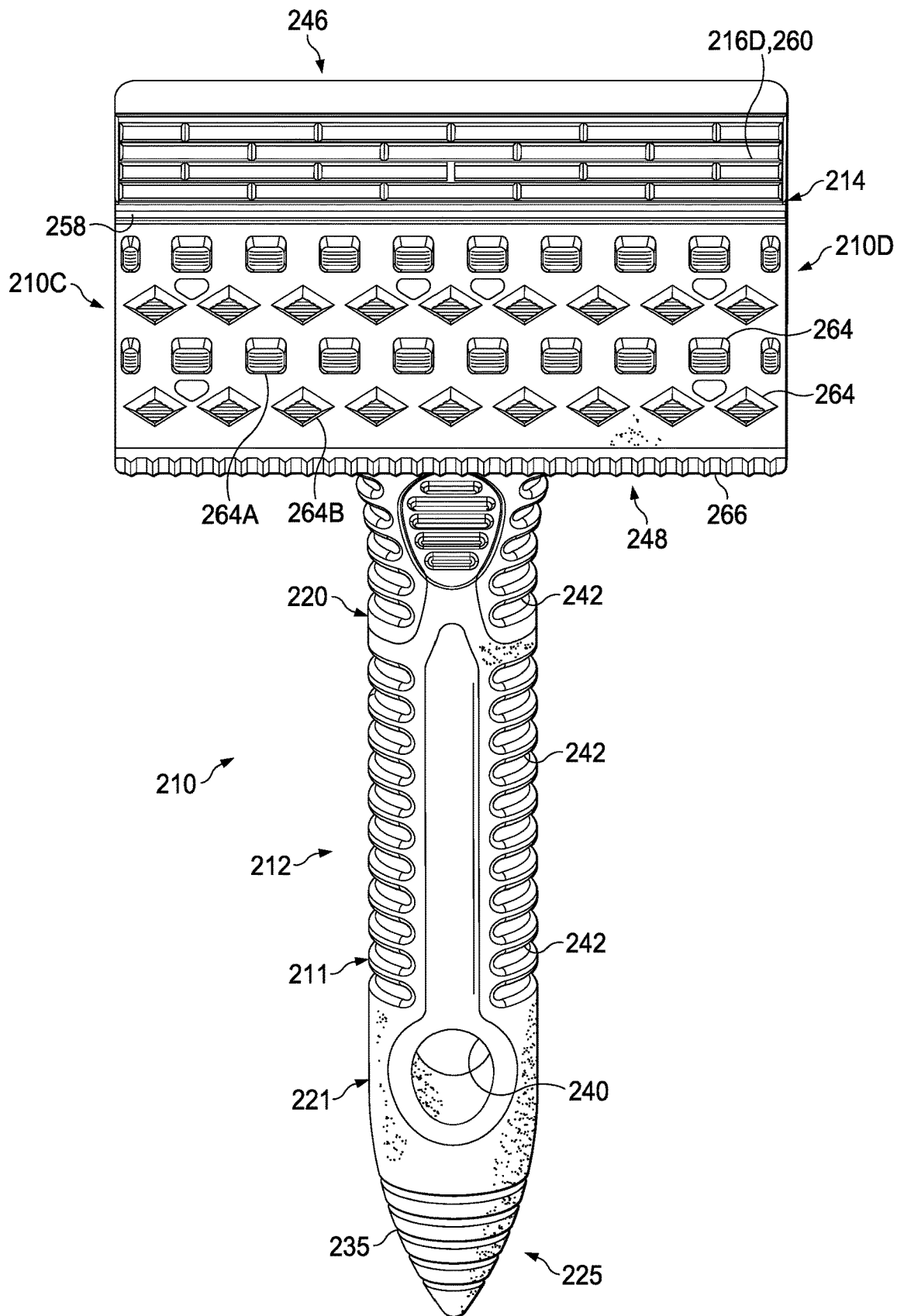
FIG. 16 (FIG. 16) is a bottom plane view of the pet hair removal apparatus in accordance with the second embodiment of the present disclosure.
Figure 17:
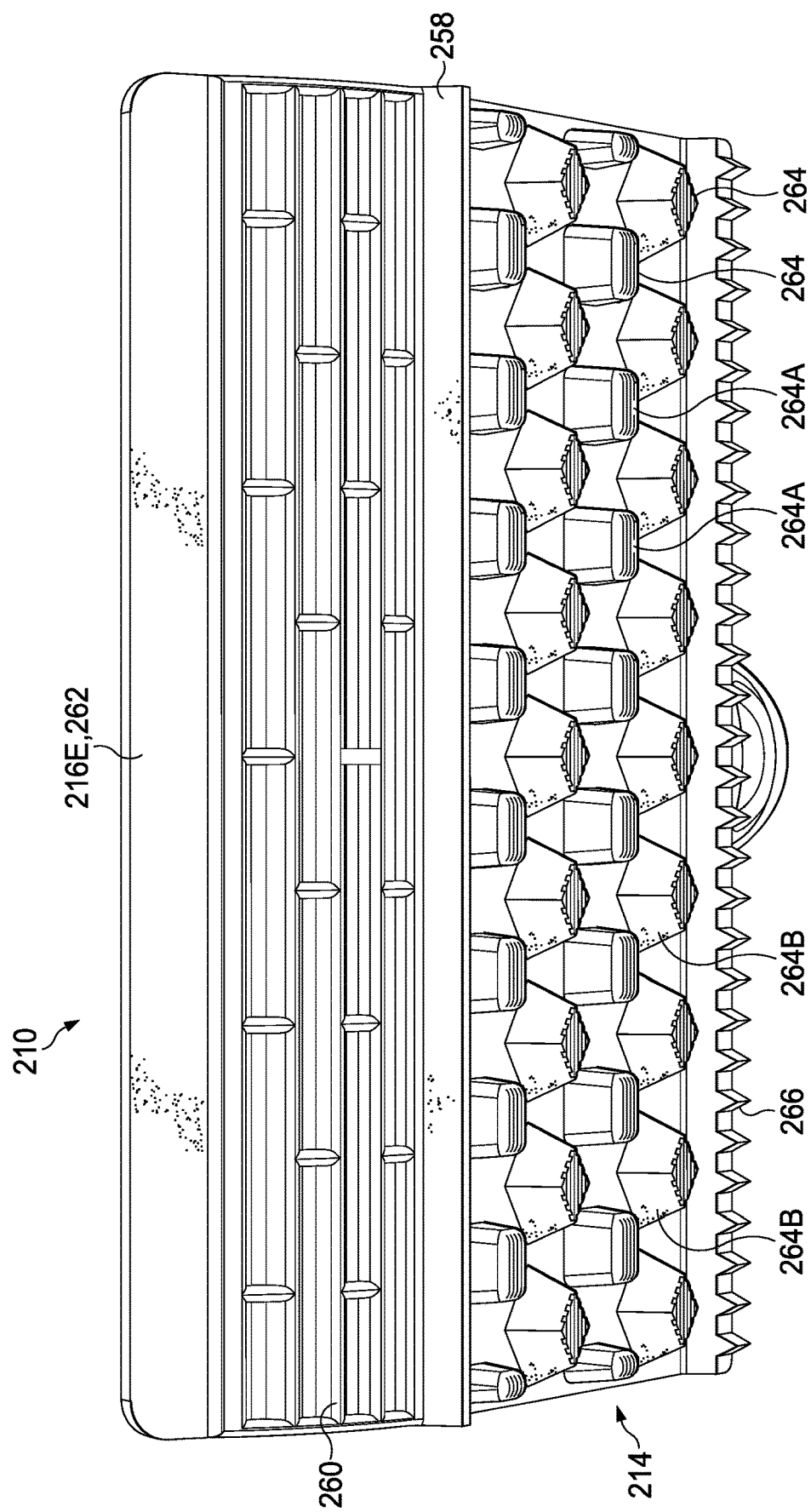
FIG. 17 (FIG. 17) is a front end elevation view of the pet hair removal apparatus in accordance with the second embodiment of the present disclosure.

In some implementations and with respect to the plurality of engaging members 216, the first engagement member 216A may include a serrate or serrated surface 266, the second engagement member 216B may include lugs or protrusions or frustums 264, the third engagement member 216C may include a first squeegee 258, the fourth engagement member 16D may include front members 260 arranged in a running bond pattern, the fifth engagement member 216E may include a second squeegee 262, and the sixth engagement member 216F may form a pointed end 225 of handle 212. The fifth engagement member 216E is positioned forwardly (i.e., more towards front surface 214) from the fourth engagement member 216D. The fourth engagement member 216D is positioned forwardly from the third engagement member 216C. The third engagement member 216C is positioned forwardly from the second engagement member 216B. The second engagement member 216B is positioned forwardly from the first engagement member 216A. The sixth engagement member 216F is rearward of the first engagement member 216A when viewed from a side elevation view, as shown in FIG. 15.

First engagement member 216A defines the serrated surface 266 and may be provided on the bottom surface of base member 214. The serrated surface 266 may include serrations that are transversely coplanar linearly aligned teeth separated by voids. In some implementations, the number of serrations provided on the serrated surface 266 may be thirty, however, any suitable number of serrations may be utilized.

Regarding the second engagement member 216B, it may be embodied by two different types of lung members. The first plurality of lug members 264A may be truncated rounded rectangular lug members. The truncated rounded rectangular lug members may include a generally rectangular sidewall and a generally rounded corners. The truncated rounded rectangular lug members of the first plurality 264A may be provided on the bottom portion of base 214. The rounded rectangular lug members of the first plurality of lug members 264A are positioned in linearly aligned rows with adjacent rows offset and spaced from one another that extend laterally or transversely across the width of the base member 214. A height of the truncated cylindrical lug members may be any suitable height. The number of truncated cylindrical lug members may be any suitable number.

The second engagement member 216B may also include the second plurality of lug members 264B that may be truncated diamond-shaped lug members and truncated polygonal lug members. The truncated diamond-shaped lug members may include a generally diamond-shaped sidewall and a generally diamond-shaped engaging surface. The truncated polygonal lug members may include a generally polygonal-shaped sidewall and a generally polygonal-shaped engaging surface. The truncated diamond-shaped lug members and truncated polygonal lug members may be provided on the bottom surface of the base member 214. More particularly, truncated diamond-shaped lug members and truncated polygonal lug members may be engaged with the bottom surface of the base member 214 such that the truncated diamond-shaped lug members are positioned in laterally or transversely linear aligned rows and the truncated polygonal lug members are positioned in laterally linear aligned rows extending across the width of the base member 214. In some implementations, the rows of truncated diamond-shaped lug members and the rows of truncated polygonal lug members are adjacent to and offset from one another. Stated otherwise, the rows alternate with one another in an offset manner. A height of the truncated diamond-shaped lug members and the truncated polygonal lug members may be any suitable height. The number of truncated diamond-shaped lug members and the truncated polygonal lug members may be any suitable number.

Figure 20A:
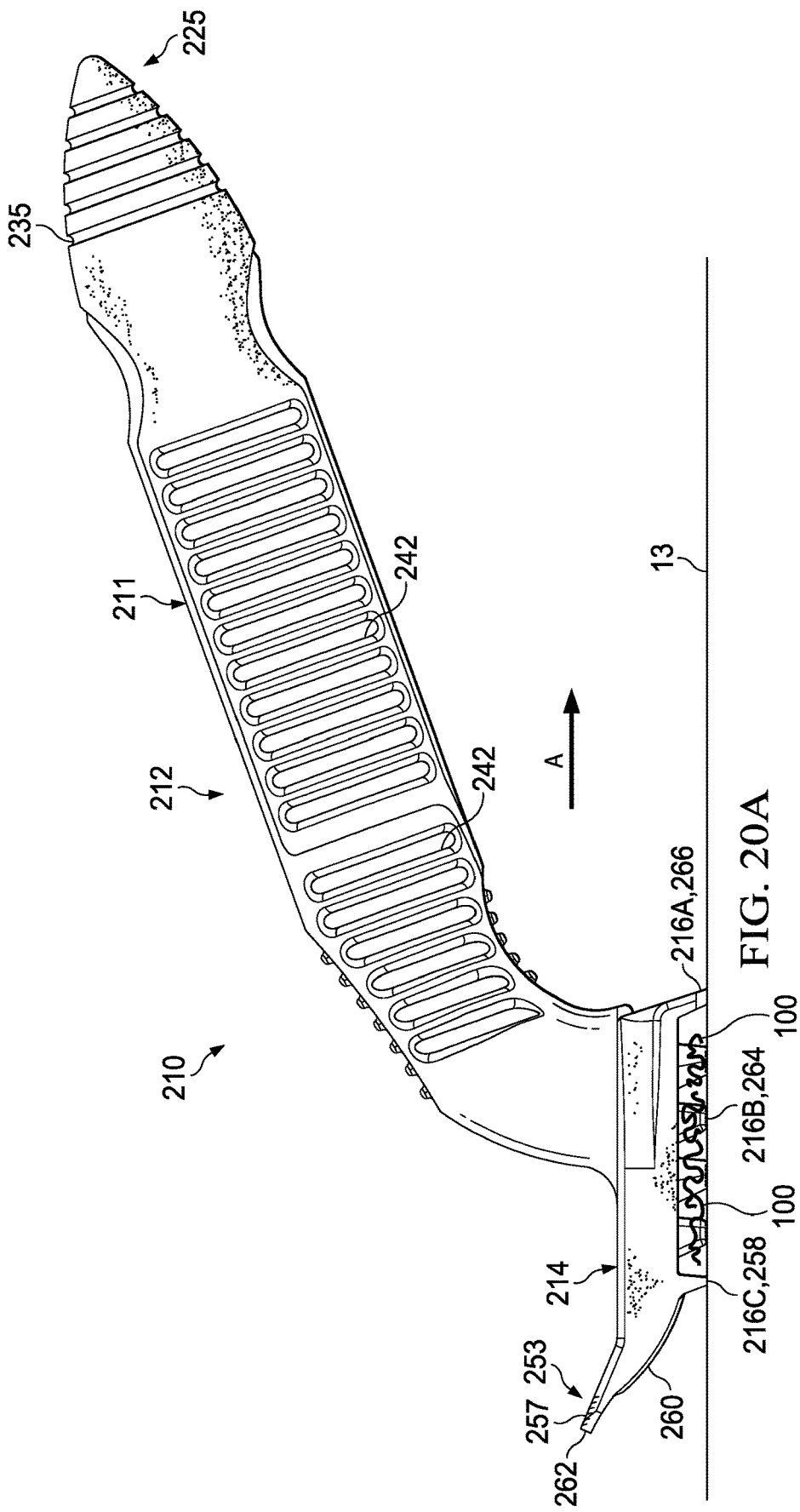
FIG. 20A (FIG. 20A) is an operational view in showing one exemplary engagement position of the second embodiment of the pet hair removal apparatus in accordance with one aspect of the present disclosure.

As depicted in FIG. 19, and with reference to the second engagement member 216B, each of the first and second plurality of lug members 264A, 264B may include a lower or bottom surface 271 that includes or defines one or more grooves. In one particular embodiment, transversely aligned striations 273, which also may be embodied as ribs or tertiary squeegees, or ridges or other textures creating a similar effect, extend transversely across the lower surface 271 between left and right sides of each respective lug member. The ribs or striations 273 extending transversely across the lower surface 271 of each respective lug from the plurality of first and second lug members 264A, 264B is utilized to assist with the pet hair 100 removal process as described herein. Further, the striations 273 may be slightly angled relative to vertical. Stated otherwise, relative to a vertical axis, the striations 273 may be canted or angled forward-to-rearward so that the upper ends of the striations are angled/tilted forward and the lower ends of the striations are angled/tilted rearward. This angular orientation assists with the removal of pet hair 100 as described herein inasmuch as the striations defining the channels in the lower surface 271 are angled forward-to-rearward (i.e., when viewed in a left side elevation view, they are diagonally aligned from top-left to bottom-right) so that when the handle of the apparatus 210 is pulled rearward as shown in FIG. 20A, the striations assist with better grasping the pet hair 100 from surface 13. In one particular embodiment, the angle of inclination of the striations 273 may be in a range from about 60 degrees to about 85 degrees relative to an imaginary horizontal axis that is coplanar with bottom surface 271 and in a range from about 30 to 15 degrees relative to an imaginary vertical axis.

Striations 273 are formed from the same material as lugs 264. When lugs 264 and striations 273 are formed from the polymer material or rubber material (or rubber-derived material), the striations are thinner than the width of the lugs 264. The striations 273 are spaced apart by a slight gap that allow the thinner striations 273 to flex or slightly bend when the handle 212 is pulled rearward, as discussed in greater detail herein. The striations 273 operate collectively as a plurality of squeegees or mini-squeegees that flex to collect pet hair 100 from surface 13. The number of spaced apart striations 273 extending across each lug 264 may vary depending on the size of the lug 264. In one embodiment, the number of striations 273 may be in a range from four striations 273 to twelve striations 273. One specific example provides either five or seven spaced apart striations 273 on each lug 264. With respect to the range of numbers of striations 273 on each lug 264, it has been determined that there may be criticality in the claimed range. Particularly, the range from about four to twelve striations provides improved pet hair 100 grasping ability to remove said hair 100 from surface 13.

As further shown in FIG. 19, the rear surface 275 of one of the lugs in the second plurality of lug members 264B is at a different angle relative to the imaginary vertical axis than the front surface 277 of the same lug. The rear surface 275 is more vertical or more closely to parallel to the imaginary vertical axis of the lug, whereas the front surface 277 is more inclined or more angled relative to the imaginary vertical axis of the lug. In one particular embodiment, the angle of inclination of the striations 273 is equal to that of the front surface 277 relative to a vertical axis. For example, if the striations are angled at 60 degrees relative to an imaginary horizontal axis that is coplanar with bottom surface 271 and 30 degrees relative to an imaginary vertical axis, then the front surface 277 would also be angled at 60 degrees relative to an imaginary horizontal axis and 30 degrees relative to an imaginary vertical axis. However, in other embodiments, the angle of inclination of the front surface 277 may be different than that of striations 273 but still be in a range from 60 degrees to about 85 degrees relative to an imaginary horizontal axis that is coplanar with bottom surface 271 and in a range from about 30 to 15 degrees relative to an imaginary vertical axis. With respect to the range of angles of inclination relative to the imaginary axes, it has been determined that there may be criticality in the claimed range. Particularly, the range from about 60 degrees to about 85 degrees relative to an imaginary horizontal axis and the range from about 30 to 15 degrees relative to an imaginary vertical axis provides improved flexibility of the striations to operate as the plurality of squeegees or "mini-squeegees" when placed on bottom surface 271 of lugs 264.

The first squeegee 258 may be made of a flexible material but is still more rigid than the second squeegee 262. In one embodiment, the first squeegee 258 is formed from the same material as the second squeegee 262, but the first squeegee 258 is more rigid because it is thicker than the second squeegee 262. Stated otherwise, the second squeegee 262 may be thinner than the first squeegee 258. The first squeegee 258 may include a front first squeegee surface, a rear first squeegee surface, and a bottom first squeegee surface. The front first squeegee surface may include a top edge, a bottom edge, a right side edge, and a left side edge. The top edge of first squeegee 258 may be positioned proximate to the bottom surface of base member 214 and may extend in a transversely between left and right sides of the base member 214. In one embodiment, first squeegee extends fully from the left side to the right side of the base member 214. First squeegee 258 extends downwardly in a cantilevered manner to the bottom first squeegee surface.

In some implementations, the front members 260 may be a plurality of connected elongated members defining a waffle-like or running bond pattern or configuration. The front members 260 may define about four rows of alternating rectangular-shaped recesses bound by linear members defining the waffle-like or running bond pattern. However, it is entirely possible for the recesses defined by front members 260 to take on another polygonal configuration defined by linear members. Further alternatively, the members of front members 260 do not need to be linear, they may be curved or curvilinear to create arcuately or curve-bound recesses at the front of the base member 214.

The front surface 246 may include portion of second squeegee 262 and a front members 260. The top surface 254 may include a squeegee portion 253 and a flat portion. The squeegee portion of the front surface 246 may meet the squeegee portion 253 of the top surface 254 at a second squeegee edge.

The second squeegee 262 may be integral with the squeegee portion of the front surface and the squeegee portion of the top surface 254, and may extend transversely or laterally between the right side surface and the left side surface of base member 214. The squeegee portion may extend away from the flat portion upwardly at an angle. The second squeegee 262 may be formed by the squeegee portion of the front surface 246 and the squeegee portion of the top surface 254. The top surface 254 may include the angled portion 253 and a flat portion. The second squeegee 262 may be formed by a portion of the front surface 246, the right side surface, the left side surface, and the top surface 254 of base member 214.

When viewing the right side surface, the squeegee portion 253 of the front surface 246 may extend away from the squeegee edge vertically downward toward the front members 260 in a linear or slightly convex manner. The squeegee portion 253 of the top surface 254 may extend vertically downward from the squeegee edge toward the flat portion at an angle relative to the flat portion of the top surface 254. The squeegee portion 253 of the top surface 254 may be formed with striations or ribs 257 or otherwise be textured to assist with the removal of pet hair 100 as detailed herein. Ribs 257 may extend fully in the transverse direction from the left side to the right side of base member 214.

The flat portion of the top surface 254 may further include a front edge, a right side edge, a left side edge, and a rear edge. The rear edge may include a first arcuate portion, a straight portion, and a second arcuate portion. The angled portion of the top surface may further include a front edge, an angled right side edge, an angled left side edge, and a rear edge. The front edge of the angled portion may be provided proximate the front end of the base member 214 and may extend in a transverse direction between the angled right side edge and the angled left side edge. The angled right side edge may extend longitudinally downward at an angle from the front edge to the rear edge. The angled left side edge may extend longitudinally downward at an angle from the front edge to the rear edge. The rear edge may be provided proximate the front edge and may extend in a transverse direction between the angled right side edge and the angled left side edge.

The front edge of base member 214 may be provided proximate the rear edge and may extend in a transverse direction between the right side edge and the left side edge. The right side edge may extend in a longitudinal direction between the front edge and the first arcuate portion of the rear edge. The left side edge may extend in a longitudinal direction between the front edge and the second arcuate portion of the rear edge. The first arcuate portion of the rear edge may extend longitudinally in an arcuate manner to the straight portion of the rear edge. The second arcuate portion of the rear edge may extend longitudinally in an arcuate manner to the straight portion of the rear edge. The straight portion of the rear edge may extend in a transverse direction between the first arcuate portion and the second arcuate portion of the rear edge.

The right side surface of the base member 214 may include an angled edge, a straight top edge, an arcuate region, a bottom arcuate edge, a front right leg member, a straight bottom edge, and a rear right leg member. The arcuate region may include a top arcuate edge, a rear edge, a right side edge, and an arcuate surface bounded by the top arcuate edge, the rear edge and the right side edge. The front right leg member may include a top end, a bottom end, a first edge, an outer surface, and a second edge. The rear right leg member may include a top end, a bottom end, a first edge, an outer surface, and a second edge. The angled edge may be provided proximate the angled right side edge, the straight top edge may be provided proximate the right side edge, and the top arcuate edge may be provided proximate the first arcuate portion of the rear edge. The rear edge of the arcuate region may extend transversely away from the straight portion of the rear edge downward at an angle and in an arcuate manner toward the right side edge which may be provided approximately midway between the straight top edge and the straight bottom edge. The right side edge extends from the rear edge longitudinally toward the front end 210A of the body 211 until a point that is coplanar with the point that the straight top edge meets the top arcuate edge of the arcuate region. The bottom arcuate edge may include a first arcuate section, a second arcuate section, and an inflection point. The bottom arcuate edge may extend longitudinally away from the front surface downward in an arcuate manner toward first edge proximate the top end of the front right leg member such that the first arcuate section is convex and the second arcuate section is concave with the change occurring at the inflection point. The outer surface extends vertically downward from the top end to the bottom end and is bounded by the first edge and the second edge. The straight bottom edge extends longitudinally from the second edge proximate the top end of the front right leg member to the first edge proximate the top end of the rear right leg member. The outer surface extends vertically downward from the top end to the bottom end and is bounded by the first edge and the second edge. The second edge of the rear right leg member extends vertically upward toward the meeting point between the rear edge and the right side edge.

The left side surface of the base member 214 may include an angled edge, a straight top edge, an arcuate region, a bottom arcuate edge, a front left leg member, a straight bottom edge, and a rear left leg member. The arcuate region may include a top arcuate edge, a rear edge, a left side edge, and an arcuate surface bounded by the top arcuate edge, the rear edge and the left side edge. The front left leg member may include a top end, a bottom end, a first edge, an outer surface, and a second edge. The rear left leg member includes a top end, a bottom end, a first edge, an outer surface, and a second edge. The angled edge may be provided proximate the angled left side edge. The straight top edge may be provided proximate the left side edge, and the top arcuate edge 166 may be provided proximate the second arcuate portion of the rear edge. The rear edge of the arcuate region may extend transversely away from the straight portion of the rear edge downward at an angle and in an arcuate manner toward the left side edge which may be provided approximately midway between the straight top edge and the straight bottom edge. The left side edge extends from the rear edge longitudinally toward the front end 210A of the body 211 until a point that is coplanar with the point that the straight top edge meets the top arcuate edge of the arcuate region. The bottom arcuate edge may include a first arcuate section, a second arcuate section, and an inflection point. The bottom arcuate edge may extend longitudinally away from the front surface downward in an arcuate manner toward first edge proximate the top end of the front left leg member such that the first arcuate section is convex and the second arcuate section is concave with the change occurring at the inflection point. The outer surface extends vertically downward from the top end to the bottom end and is bounded by the first edge and the second edge. The straight bottom edge extends longitudinally from the second edge proximate the top end of the front left leg member to the first edge proximate the top end of the rear right leg member. The outer surface extends vertically downward from the top end to the bottom end and is bounded by the first edge and the second edge. The second edge of the rear right leg member extends vertically upward toward the meeting point between the rear edge and the right side edge. The outer surface extends vertically downward from the top end to the bottom end and is bounded by the first edge and the second edge. The second edge of the rear left leg member extends vertically upward toward the meeting point between the rear edge and the left side edge.

The front surface of base member 214 may include a top surface portion, an intermediate portion and a bottom portion. The top surface portion may include a top edge, a bottom edge, a right rounded corner, and a left rounded corner. The top edge may be provided proximate the front edge of the angled portion. The right rounded corner may be provided proximate the angled right side edge and the angled edge. The left rounded corner may be provided proximate the angled left side edge and the angled edge. The top edge may extend in a transverse direction between the right rounded corner and the left rounded corner. The bottom edge may be spaced a distance away from the top edge and may extend in a transverse direction between the right rounded corner and the left rounded corner parallel to the top edge. The intermediate portion may include a bottom edge that extends transversely between the inflection point and the inflection point. The intermediate portion may be bounded by the bottom edge, the first arcuate section of the bottom arcuate edge, the first arcuate section of the bottom arcuate edge, and the bottom edge. The bottom portion may include a bottom edge extending transversely between a point where the second arcuate section of the bottom arcuate edge meets the first edge of the front right leg member and a point where the second arcuate section of the bottom arcuate edge meets the first edge of the front left leg member. The bottom portion may be bounded by the bottom edge, the second arcuate section of the bottom arcuate edge, the second arcuate section of the bottom arcuate edge, and the bottom edge.

The rear surface of base member 214 may include a first angled top edge, a straight top edge, a second angled top edge, a first side edge, a second side edge, a bottom edge, and a bottom surface, and an inner sidewall. The first angled top edge may be provided proximate the rear edge of the arcuate region, the straight top edge may be provided proximate the straight portion of the rear edge, the second angled top edge may be provided proximate the rear edge of the arcuate region, the first side edge may extend vertically downward from a point where the right side edge meets the rear edge to the bottom edge. The second side edge may extend vertically downward from a point where the left side edge meets the rear edge to the bottom edge. The bottom edge may extend in a transverse direction between the first side edge and the second side edge. The bottom surface may extend transversely between the bottom end of the rear right leg member and the bottom end of the rear left leg member. The inner sidewall may extend in a transverse direction between the first edge of the rear right leg member and the first edge rear left leg member.

The rear right leg member of the base member 214 may include a top end, a bottom end, a first edge, an outer surface, and a second edge. The first side edge and the second side edge may be proximate to the bottom edge. The inner sidewall may include a top edge and a bottom edge, and may extend transversely between the first side edge and the second side edge proximate to the bottom edge. The bottom surface may extend longitudinally toward the top edge of the inner sidewall.

Referring back to FIG. 15 and FIG. 18, the pointed end 225 of handle 212 extends rearward from aperture 240 to the pointed tip 231 that defines the second end of the handle 212. The pointed end 225 may be considered to be another engagement member, or the sixth engagement member 216F. The pointed end 225 is configured to be a sixth engagement member inasmuch as the pointed end 225 is utilized to perform a sixth mode of operation (i.e., a sixth operational engagement position) to remove pet hair 100 from a surface 13. Namely, the pointed tip 231 of end 225 can be inserted into a crack or crease in the surface 13 to assist in the removal of pet hair 100 from surface 13 at the crack or crease by dragging the pointed tip 231 along the length of the crease or crack in the surface 13. The pointed end 225 includes an outer surface 233 that may define a generally conical configuration. As such, the outer surface 233 may be smoothly or convexly curved extending circumferentially around axis X. In one exemplary embodiment, the outer surface 233 is interrupted by one or more grooves 235 extending circumferentially around the axis X in the outer surface 233. Grooves 235 may be spaced apart from each other and have a depth extending inwardly towards the axis X from the outer surface 233. The grooves may be semicircular in cross section as best seen in FIG. 18 such that they form a concavely curved channel. One embodiment may provide a single groove that helically or spirally winds around the outer surface 233 of the pointed end 225 and another alternative embodiment has a plurality of distinct and independent grooves 235 each their own circumferential extension around the axis X formed in and spaced apart from each other in the pointed end 225. When the grooves 235 are a plurality of independent grooves, the number of grooves 235 may be in a range from about four grooves to about seven grooves. In one particular embodiment, there may be five grooves. With respect to the range of numbers of grooves 235, it has been determined that there may be criticality in the claimed range. Particularly, the range from about four to seven grooves 235 improves pet hair 100 grasping ability to remove said hair 100 from surface 13.

Pointed end 225 may be formed from the same material as base member 214. Thus, when formed as a polymer, rubber, or rubber-derived material, the pointed end 225 may have certain flexible or flexure capabilities. Namely, the edges of the concave surface defining the channel for the grooves 235 have slightly flex or bend in response to the movement of the handle 212 by dragging pointed tip 231 along a crease, crevice or the like in surface 13.

Having thus described the structure of the apparatus 210, and its associated components, primary reference is now made to FIG. 20A through FIG. 20F to depict exemplary implementations and operations of the apparatus 210 for removing pet hair 100 from fabrics and/or surfaces 13. It should be noted that one of the benefits of the apparatus 210 of the present disclosure is that the apparatus 210 may utilize a plurality of engaging members 216 via a plurality of engagement positions to remove pet hair 100 from a variety of fabrics and/or surfaces 13. In this implementation, the apparatus 210 will be described as being operable to remove pet hair 100 from a fabric surface 13. Although the apparatus 210 is described as being used with a fabric surface 13, the apparatus for removing pet hair may be utilized with any suitable fabric and/or surface and/or the like.

With primary reference to FIG. 20A, one exemplary operational engagement position of the apparatus 210 is shown. When this engagement position is utilized, the bottom surface of the first squeegee 258, the plurality of lug members 264, and the serrated surface 266 may be engaged with the fabric surface 13 to remove the pet hair 100. More particularly, an operator may manipulate the apparatus 210 via gripping portion 220 of the handle member 212. Once the operator engages the first squeegee 258, the plurality of lug members 264, and the serrated surface 266 with the fabric surface 13, the operator moves the apparatus 210 in a direction generally indicated at arrow A such that one or more of the bottom surface of the first squeegee 258, the lug members 264, and the serrated surface 266 contacts and loosens and/or removes the pet hair 100 from the fabric surface 13. More particularly, and with reference to FIG. 20A, after the operator moves the apparatus 10 in the direction indicated by arrow A, the operator may lift the apparatus 210 in a generally vertical direction so that the pet hair 100 may be removed from the fabric surface 13 and/or the pet hair 100 may be removed from the apparatus 210.

When used in this first operational engagement position, and with reference back to FIG. 19, when the handle 212 is maneuvered to pull the base member 214 rearward in the direction of arrow A, the force applied causes the striations 273 on the lower surface 271 of lugs 264 to flex or deflect. Namely, the striations 273 flex from their normal/resting or first angled position to a second angled position. The rearward movement causes the striations 273 to flex in a manner that they approach more parallel to the imaginary vertical axis extending through the lug 264. Stated otherwise, the second angle or the second angled position is more close to parallel relative to the imaginary vertical axis. The flexure of the striations 273 causes the striations to act as minisqueegees or tertiary squeegees to gather pet hair 100 from surface 13 working collectively to gather pet hair 100 in the gaps defined between the striations 273. The flexure of striations 273 may also be accomplished by applying downward pressure to the striations 273. The flexure of the striations 273 may also be considered its own independent operational engagement position (i.e., a seventh operational engagement position) that may be independent from the first operational engagement position).

Figure 20B:
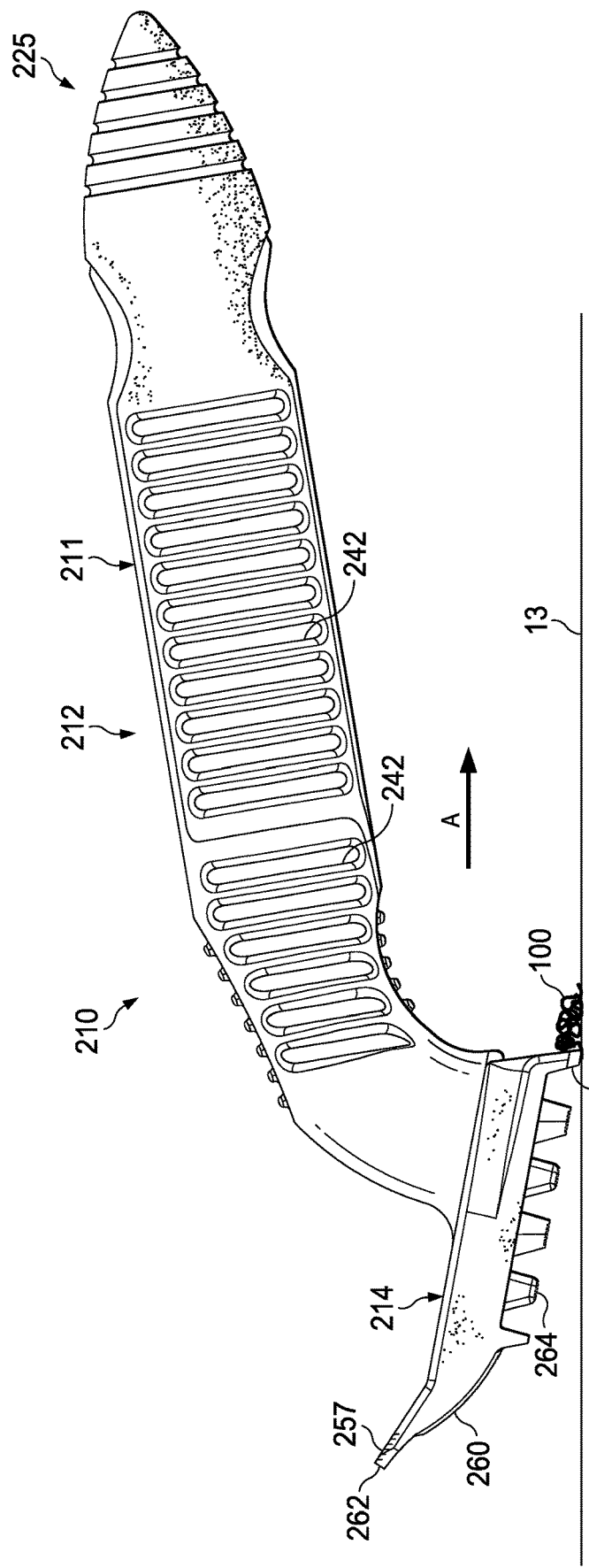
FIG. 20B (FIG. 20B) is an operational view in showing another exemplary engagement position of the second embodiment of the pet hair removal apparatus in accordance with one aspect of the present disclosure.

With primary reference to FIG. 20B, one exemplary operational engagement position of the apparatus 10 is shown. When this engagement position is utilized, the serrated surface 266 may be engaged with the fabric surface 13 to remove the pet hair 100. More particularly, an operator may manipulate the apparatus 10 via gripping portion 220 of the handle member 212. The operator engages the serrated surface 266 with the fabric surface 13 by angling or canting the base member 214 to a position that orients the front of the base member 214 slightly upward such that only the serrated surface 266 engages the surface 13. Then, the operator moves the apparatus 210 in a direction generally indicated at arrow A such that the serrated surface 66 contacts and loosens and/or removes the pet hair 100 from the fabric surface 13 without assistance from other engagement members 216B-216E or 216F.

Figure 20C:
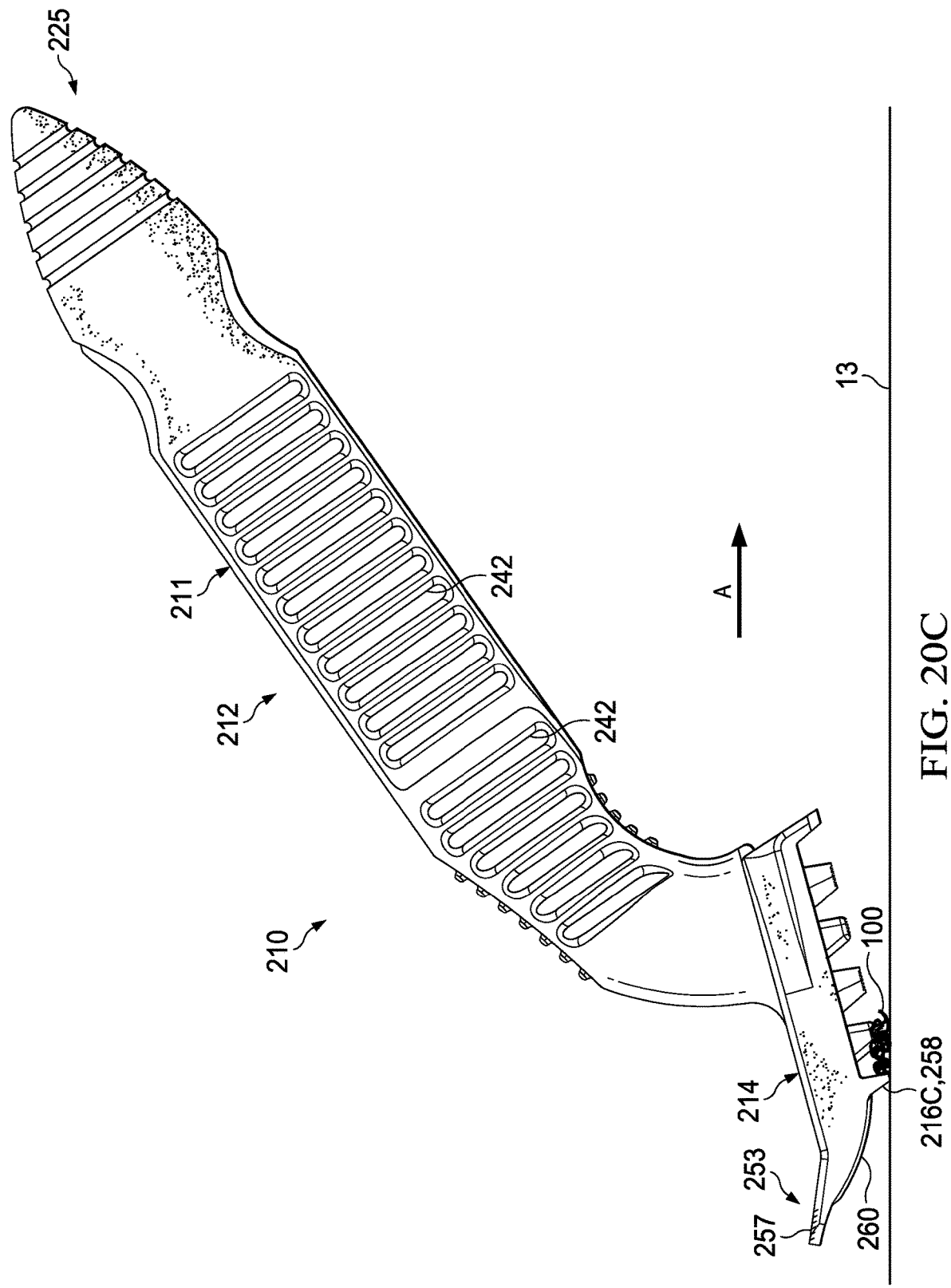
FIG. 20C (FIG. 20C) is an operational view in showing another exemplary engagement position of the second embodiment of the pet hair removal apparatus in accordance with one aspect of the present disclosure.

With primary reference to FIG. 20C, one exemplary operational engagement position of the apparatus 210 is shown. When this engagement position is utilized, the bottom surface of the first squeegee 258 may be engaged with the fabric surface 13 to remove the pet hair 100. More particularly, an operator may manipulate the apparatus 210 via gripping portion 220 of the handle member 212 to engage the first squeegee 258 with surface 212 by angling or canting the handle 212 upward so as to tilt the front portion of base member 214 downwardly. In this position, the first squeegee 258 engages the fabric 13 without the assistance of the other engagement members. Once the operator engages the fabric surface 13 with the first squeegee 258, the operator moves the apparatus 210 in a direction generally indicated at arrow A such that the bottom surface of the first squeegee 258 contacts and loosens and/or removes the pet hair 100 from the fabric surface 13. The pet hair 100 may be removed in a substantially similar manner as described in relation to FIG. 20A above.

Figure 20D:
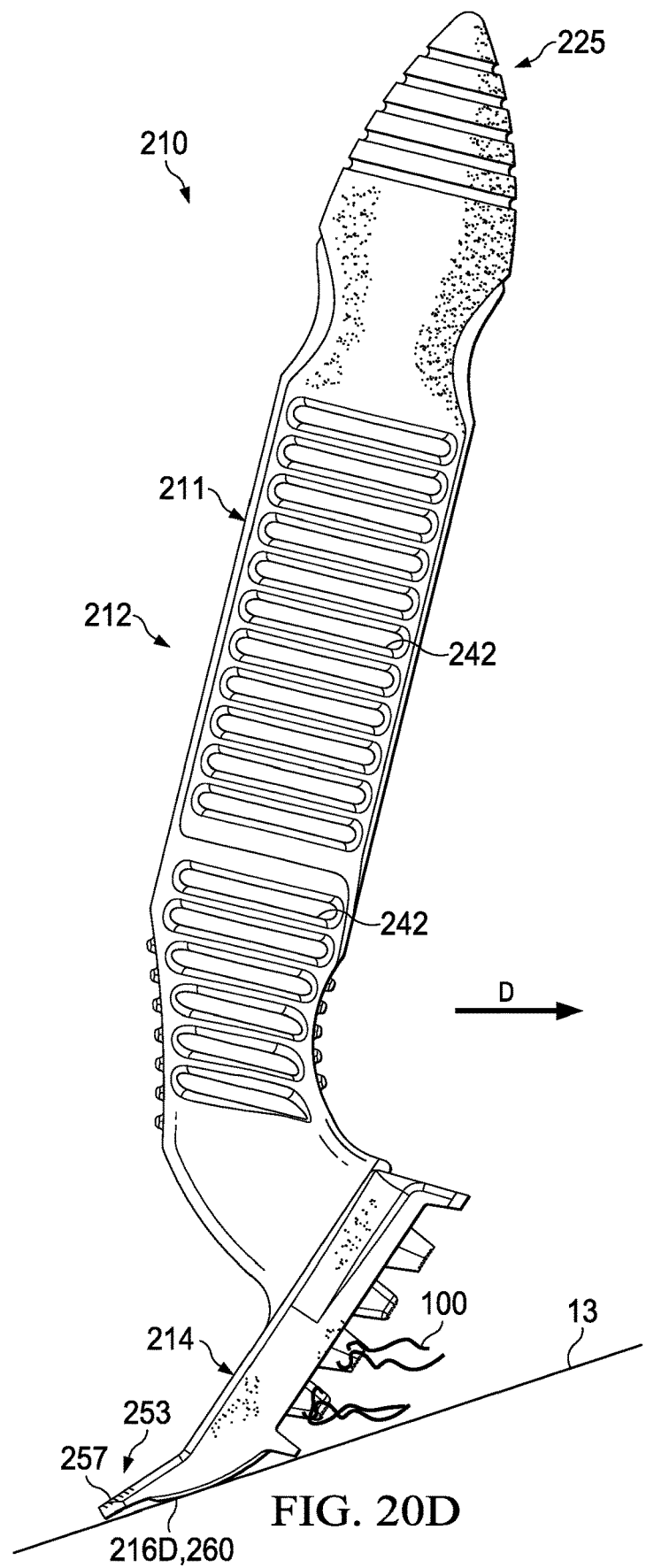
FIG. 20D (FIG. 20D) is an operational view in showing another exemplary engagement position of the second embodiment of the pet hair removal apparatus in accordance with one aspect of the present disclosure.

With primary reference to FIG. 20D, one exemplary operational engagement position of the apparatus 210 is shown. When this engagement position is utilized, the waffle-like pattern or running bond pattern of the fourth engagement members 216D may be engaged with the fabric surface 13 to remove the pet hair 100. More particularly, an operator may manipulate the apparatus 210 via gripping portion 220 of the handle member 212 to raise handle so as to tilt the front of the base member forward and downward so as to only engage the fourth engagement members 216D with surface 13. Once the operator engages the fourth engagement members 216D with the fabric surface 13, the operator moves the apparatus 10 in a direction generally indicated at arrow D such that the fourth engagement member 216D contacts and loosens and/or removes the pet hair 100 from the fabric surface 13 without the assistance of the other engagement members.

Figure 20E:
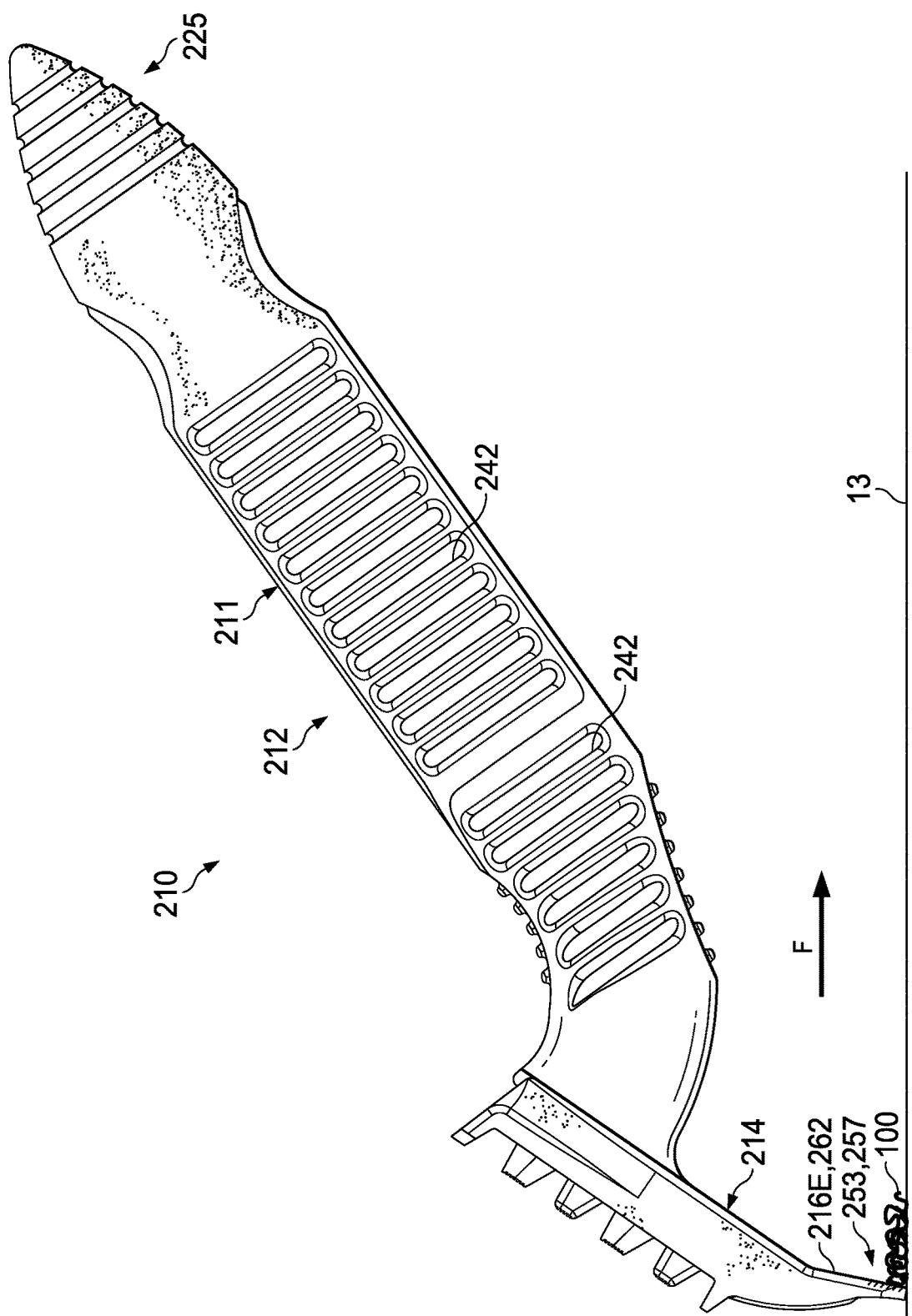
FIG. 20E (FIG. 20E) is an operational view in showing another exemplary engagement position of the second embodiment of the pet hair removal apparatus in accordance with one aspect of the present disclosure.

With primary reference to FIG. 20E, one exemplary operational engagement position of the apparatus 10 is shown. When this engagement position is utilized, the top surface portion of the second squeegee 266 may be engaged with the fabric surface 13 to remove the pet hair 100. More particularly, an operator may manipulate the apparatus 210 via the gripping portion 220 of the handle member 212 and "flipping over" the base member such that the squeegee surface 253 of second squeegee 266 engages fabric 13. Once the operator engages the second squeegee 266 with the fabric surface 13, the operator moves the apparatus 210 in a direction generally indicated at arrow F such that the top surface portion or the squeegee surface 253 of second squeegee 266 contacts and loosens and/or removes the pet hair 100 from the fabric surface 13 without the assistance of the other engagement members.

Figure 20F:
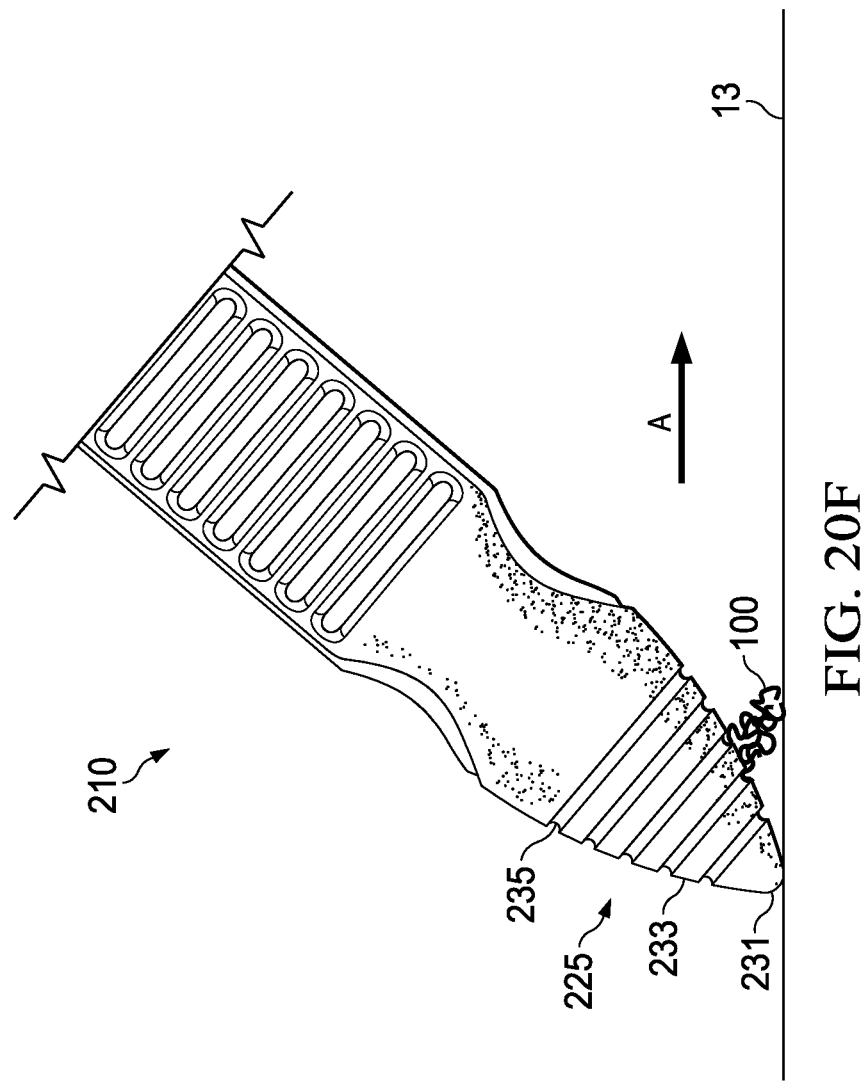
FIG. 20F (FIG. 20F) is an operational view in showing another exemplary engagement position of the second embodiment of the pet hair removal apparatus in accordance with one aspect of the present disclosure.

With primary reference to FIG. 20F, one exemplary operational engagement position of the apparatus 10 is shown. When this engagement position is utilized, the tip 231 of the pointed end 225 or the sixth engagement member 216F may be engaged with a crease, crevice, crack or fold in the fabric surface 13 to remove the pet hair 100. More particularly, an operator may manipulate the apparatus 210 via the gripping portion 220 of the handle member 212 and pointing the pointed end 225 towards fabric 13. Once the operator engages the tip 231 of pointed end 225 with the fabric surface 13, the operator moves the apparatus 210 in a direction generally indicated at arrow A such that the pointed end contacts and loosens, with the assistance of grooves 235, and/or removes the pet hair 100 from the fabric surface 13 without the assistance of the other engagement members. When used in a crevice or crack, the pointed tip 231 engages the edge of the crease or crevice, then the outer surface 233 contacts the sides of the crease or crevice. The handle 212 is maneuvered to pull pointed tip 231 along the edge of the crease or crevice so that grooves 235 can capture, gather, and remove pet hair 100 from the surface 13. The tip 231 may also loosen or move debris or hair 100 residing along the edge of the crease or crevice.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The term surface or surface 13 as used herein is specifically excludes the surface of a living object such as an animal/pet and it specifically refer to the surface of an inanimate object, such as a couch or bed or other furniture, or other fabric or the like. As such it shall be apparent that the apparatus 10 or 210 is understood to be a device that removes pet hair 100 from the surface of an inanimate object and not to be considered a pet brush that would otherwise be used to brush a pet's fur from the skin surface of an animal.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A pet hair removal apparatus comprising:
a gripping portion;
a base member coupled to the gripping portion;
a plurality of engagement members on the base member, wherein the plurality of engagement members is adapted to engage a surface of an inanimate object, and wherein the plurality of engagement members includes a first engagement member and a second engagement member;
a plurality of operational engagement positions, wherein the plurality of operational engagement positions includes a first engagement position and a second engagement position;
wherein when the base member is in the first operational engagement position, both the first engagement member and the second engagement member contact the surface and the base member is oriented at a first orientation relative to the surface;
wherein when the base member is in the second operational engagement position, only one of the first engagement member and the second engagement member contact the surface and the base member is at a second orientation relative to the surface;
wherein the first operational engagement position is different from the second operational engagement position; and
a third engagement member in the plurality of engagement members;
wherein when the base member is in the first operational engagement position, all three of the first engagement member, the second engagement member, and the third engagement member contact the surface.

2. A pet hair removal apparatus comprising:
a gripping portion;
a base member coupled to the gripping portion;
a plurality of engagement members on the base member, wherein the plurality of engagement members is adapted to engage a surface of an inanimate object, and wherein the plurality of engagement members includes a first engagement member and a second engagement member;
a plurality of operational engagement positions, wherein the plurality of operational engagement positions includes a first engagement position and a second engagement position;
wherein when the base member is in the first operational engagement position, both the first engagement member and the second engagement member contact the surface and the base member is oriented at a first orientation relative to the surface;
wherein when the base member is in the second operational engagement position, only one of the first engagement member and the second engagement member contact the surface and the base member is at a second orientation relative to the surface;
wherein the first operational engagement position is different from the second operational engagement position;
a third engagement member in the plurality of engagement members;
a third operational engagement position of the base member; and
wherein when the base member is in the third operational engagement position, only the third engagement member contacts the surface and the base member is oriented at a third orientation relative to the surface;
wherein the third operational engagement position is different from the first and second operational engagement positions.

3. The pet hair removal apparatus of claim 2, further comprising:
a fourth engagement member in the plurality of engagement members;
a fourth operational engagement position of the base member; and
wherein when the base member is in the fourth operational engagement position, only the fourth engagement member contacts the surface and the base member is oriented at a fourth orientation relative to the surface;
wherein the fourth operational engagement position is different from the first, second, and third operational engagement positions.

4. The pet hair removal apparatus of claim 3, further comprising:
a fifth engagement member in the plurality of engagement members;
a fifth operational engagement position of the base member; and
wherein when the base member is in the fifth operational engagement position, only the fifth engagement member contacts the surface and the base member is oriented at a fifth orientation relative to the surface;
wherein the fifth operational engagement position is different from the first, second, third, and fourth operational engagement positions.

5. The pet hair removal apparatus of claim 4, further comprising:
a sixth engagement member in the plurality of engagement members;
a sixth operational engagement position of the base member; and
wherein when the gripping portion and the base member is in the sixth operational engagement position, only the sixth engagement member contacts the surface and the base member is oriented at a sixth orientation relative to the surface;
wherein the sixth operational engagement position is different from the first, second, third, fourth, and fifth operational engagement positions.

6. A pet hair removal apparatus comprising:
a gripping portion;
a base member coupled to the gripping portion;
a plurality of engagement members on the base member, wherein the plurality of engagement members is adapted to engage a surface of an inanimate object, and wherein the plurality of engagement members includes a first engagement member and a second engagement member;
a plurality of operational engagement positions, wherein the plurality of operational engagement positions includes a first engagement position and a second engagement position;
wherein when the base member is in the first operational engagement position, both the first engagement member and the second engagement member contact the surface and the base member is oriented at a first orientation relative to the surface;
wherein when the base member is in the second operational engagement position, only one of the first engagement member and the second engagement member contact the surface and the base member is at a second orientation relative to the surface;
wherein the first operational engagement position is different from the second operational engagement position; and
a lower surface of the second engagement member, wherein second engagement member is a frustum that projects downwardly from a portion of the base member and terminates at the lower surface of the second engagement member.

7. The pet hair removal apparatus of claim 6, further comprising:
a ribbed or striated lower surface of the second engagement member.

8. A pet hair removal apparatus comprising:
a gripping portion;
a base member coupled to the gripping portion;
a plurality of engagement members on the base member, wherein the plurality of engagement members is adapted to engage a surface of an inanimate object, and wherein the plurality of engagement members includes a first engagement member and a second engagement member;
a plurality of operational engagement positions, wherein the plurality of operational engagement positions includes a first engagement position and a second engagement position;
wherein when the base member is in the first operational engagement position, both the first engagement member and the second engagement member contact the surface and the base member is oriented at a first orientation relative to the surface;
wherein when the base member is in the second operational engagement position, only one of the first engagement member and the second engagement member contact the surface and the base member is at a second orientation relative to the surface;
wherein the first operational engagement position is different from the second operational engagement position; and
a third engagement member in the plurality of engagement members;
wherein the third engagement member is a first squeegee extending laterally between first and second sides of the base member.

9. A pet hair removal apparatus comprising:
a gripping portion;
a base member coupled to the gripping portion;
a plurality of engagement members on the base member, wherein the plurality of engagement members is adapted to engage a surface of an inanimate object, and wherein the plurality of engagement members includes a first engagement member and a second engagement member;
a plurality of operational engagement positions, wherein the plurality of operational engagement positions includes a first engagement position and a second engagement position;
wherein when the base member is in the first operational engagement position, both the first engagement member and the second engagement member contact the surface and the base member is oriented at a first orientation relative to the surface;
wherein when the base member is in the second operational engagement position, only one of the first engagement member and the second engagement member contact the surface and the base member is at a second orientation relative to the surface;
wherein the first operational engagement position is different from the second operational engagement position; and
a third engagement member in the plurality of engagement members;
a fourth engagement member in the plurality of engagement members, wherein the fourth engagement member is defined by a running-bond configuration formed in a convex surface of the base member.

10. A pet hair removal apparatus comprising:
a gripping portion;
a base member coupled to the gripping portion;
a plurality of engagement members on the base member, wherein the plurality of engagement members is adapted to engage a surface of an inanimate object, and wherein the plurality of engagement members includes a first engagement member and a second engagement member;
a plurality of operational engagement positions, wherein the plurality of operational engagement positions includes a first engagement position and a second engagement position;
wherein when the base member is in the first operational engagement position, both the first engagement member and the second engagement member contact the surface and the base member is oriented at a first orientation relative to the surface;

wherein when the base member is in the second operational engagement position, only one of the first engagement member and the second engagement member contact the surface and the base member is at a second orientation relative to the surface;

wherein the first operational engagement position is different from the second operational engagement position; and a third engagement member in the plurality of engagement members, wherein the third engagement member is a first squeegee;

a fourth engagement member in the plurality of engagement members; and a fifth engagement member in the plurality of engagement members, wherein the fifth engagement member is a second squeegee extending laterally between first and second sides of the base member, wherein the fifth engagement member is positioned above the first, second, third, and fourth engagement members when viewed in a side elevation view.

11. A pet hair removal apparatus comprising:
a gripping portion;
a base member coupled to the gripping portion;
a plurality of engagement members on the base member, wherein the plurality of engagement members is adapted to engage a surface of an inanimate object, and wherein the plurality of engagement members includes a first engagement member and a second engagement member;
a plurality of operational engagement positions, wherein the plurality of operational engagement positions includes a first engagement position and a second engagement position;
wherein when the base member is in the first operational engagement position, both the first engagement member and the second engagement member contact the surface and the base member is oriented at a first orientation relative to the surface;
wherein when the base member is in the second operational engagement position, only one of the first engagement member and the second engagement member contact the surface and the base member is at a second orientation relative to the surface;
wherein the first operational engagement position is different from the second operational engagement position;
a third engagement member in the plurality of engagement members;
a fourth engagement member in the plurality of engagement members;
a fifth engagement member in the plurality of engagement members;
a handle, and the gripping portion is on the handle; and
a sixth engagement member in the plurality of engagement members, wherein the sixth engagement is defined by a pointed end of the handle.

12. The pet hair removal apparatus of claim 11, further comprising:
one or more grooves formed in the pointed end of the handle.

13. A pet hair removal apparatus comprising:
a gripping portion;
a base member coupled to the gripping portion;
a plurality of engagement members on the base member, wherein the plurality of engagement members is adapted to engage a surface of an inanimate object, and wherein the plurality of engagement members includes a first engagement member and a second engagement member;
a plurality of operational engagement positions, wherein the plurality of operational engagement positions includes a first engagement position and a second engagement position;
wherein when the base member is in the first operational engagement position, both the first engagement member and the second engagement member contact the surface and the base member is oriented at a first orientation relative to the surface;
wherein when the base member is in the second operational engagement position, only one of the first engagement member and the second engagement member contact the surface and the base member is at a second orientation relative to the surface;
wherein the first operational engagement position is different from the second operational engagement position;
a first squeegee on the base member;
a second squeegee on the base member, wherein the first squeegee and the second squeegee are disposed offset to one end of the second engagement member, and the first engagement member is disposed offset to an opposite end of the second engagement member.

14. The pet hair removal apparatus of claim 13, wherein the first squeegee is more rigid than the second squeegee.

15. A pet hair removal apparatus comprising:
a gripping portion;
a base member coupled to the gripping portion;
a plurality of engagement members on the base member, wherein the plurality of engagement members is adapted to engage a surface of an inanimate object, and wherein the plurality of engagement members includes a first engagement member and a second engagement member;
a plurality of operational engagement positions, wherein the plurality of operational engagement positions includes a first engagement position and a second engagement position;
wherein when the base member is in the first operational engagement position, both the first engagement member and the second engagement member contact the surface and the base member is oriented at a first orientation relative to the surface;
wherein when the base member is in the second operational engagement position, only one of the first engagement member and the second engagement member contact the surface and the base member is at a second orientation relative to the surface;
wherein the first operational engagement position is different from the second operational engagement position; and
wherein the second engagement member is one of a plurality of second engagement members that are spaced apart and arranged in a row extending laterally from side to side of the base member.

16. A pet hair removal apparatus comprising:
a gripping portion;
a base member coupled to the gripping portion;
a plurality of engagement members on the base member, wherein the plurality of engagement members is adapted to engage a surface of an inanimate object, and wherein the plurality of engagement members includes a first engagement member and a second engagement member;
a plurality of operational engagement positions, wherein the plurality of operational engagement positions includes a first engagement position and a second engagement position;
wherein when the base member is in the first operational engagement position, both the first engagement member and the second engagement member contact the surface and the base member is oriented at a first orientation relative to the surface;
wherein when the base member is in the second operational engagement position, only one of the first engagement member and the second engagement member contact the surface and the base member is at a second orientation relative to the surface;
wherein the first operational engagement position is different from the second operational engagement position; and
a third engagement member in the plurality of engagement members;
a fourth engagement member in the plurality of engagement members, wherein the fourth engagement member is defined by a running-bond configuration.

* * * * *